United States Patent
Taherzadeh Boroujeni et al.

(10) Patent No.: US 11,432,339 B2
(45) Date of Patent: Aug. 30, 2022

(54) MESSAGE REPETITION FOR RANDOM ACCESS PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/102,867

(22) Filed: Nov. 24, 2020

(65) Prior Publication Data

US 2021/0168873 A1 Jun. 3, 2021

Related U.S. Application Data

(60) Provisional application No. 62/942,039, filed on Nov. 29, 2019.

(51) Int. Cl.
*H04W 74/08* (2009.01)
*H04W 74/04* (2009.01)
*H04W 72/08* (2009.01)
*H04W 72/04* (2009.01)
*H04W 74/00* (2009.01)

(52) U.S. Cl.
CPC ... *H04W 74/0833* (2013.01); *H04W 72/0413* (2013.01); *H04W 72/085* (2013.01); *H04W 74/006* (2013.01); *H04W 74/04* (2013.01)

(58) Field of Classification Search
CPC .. H04L 1/08; H04W 72/0413; H04W 72/085; H04W 74/006; H04W 74/04; H04W 74/0833
See application file for complete search history.

(56) References Cited

U.S. PATENT DOCUMENTS

2016/0143059 A1 5/2016 Jha et al.
2016/0270038 A1* 9/2016 Papasakellariou .... H04L 1/1671
(Continued)

OTHER PUBLICATIONS

International Search Report and Written Opinion—PCT/US2020/062359—ISA/EPO—dated Mar. 18, 2021.
(Continued)

*Primary Examiner* — Kashif Siddiqui
(74) *Attorney, Agent, or Firm* — Holland & Hart LLP

(57) ABSTRACT

Methods, systems, and devices for wireless communications are described. In some systems, a user equipment (UE) may attempt to connect to a base station using a random access procedure. During the random access procedure, the base station may transmit control information associated with a random access response (RAR) during an RAR window. The UE may attempt to receive a single instance of the control information and, in some cases, may be unable to receive and decode the single instance of the control information. The base station may configure a portion of the RAR window to support transmitting repeating instances of the control information. The UE may identify a quantity of instances of the control information and combine the quantity of instances. The UE may successfully decode the combined quantity of repetitions and identify a location for receiving the RAR based on decoding the combined instances of control information.

30 Claims, 17 Drawing Sheets

(56) References Cited

U.S. PATENT DOCUMENTS

| | | | |
|---|---|---|---|
| 2016/0330633 A1* | 11/2016 | You | H04W 16/26 |
| 2016/0345301 A1* | 11/2016 | Webb | H04W 72/0446 |
| 2017/0280481 A1* | 9/2017 | Stern-Berkowitz | H04L 1/1854 |
| 2017/0280483 A1* | 9/2017 | Liu | H04W 74/0833 |
| 2017/0290064 A1* | 10/2017 | Liu | H04W 74/0833 |
| 2018/0176957 A1 | 6/2018 | Zhang et al. | |
| 2018/0212736 A1* | 7/2018 | Chatterjee | H04W 48/12 |
| 2021/0234637 A1* | 7/2021 | Taherzadeh Boroujeni | H04W 74/006 |
| 2021/0235510 A1* | 7/2021 | Taherzadeh Boroujeni | H04W 74/006 |

OTHER PUBLICATIONS

LG Electronics: "Details on RACH Procedure for MTC UE", 3GPP Draft, 3GPP TSG RAN WG1 Meeting #83, R1-156847_PRACH_V3, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051003203, 6 Pages, Retrieved from the Internet: URL:http://www.3gpp.org/ftp/Meetings_3GPP_SYNC/RAN1/Docs/ [retrieved on Nov. 15, 2015], pp. 1, 3-4.

* cited by examiner

Portion 415  Portion 420  Portion 425

MESSAGE REPETITION FOR RANDOM ACCESS PROCEDURE

CROSS REFERENCE

The present application for patent claims the benefit of U.S. Provisional Patent Application No. 62/942,039 by TAHERZADEH BOROUJENI et al., entitled "MESSAGE REPETITION FOR RANDOM ACCESS PROCEDURE," filed Nov. 29, 2019, assigned to the assignee hereof, and expressly incorporated by reference herein.

FIELD OF TECHNOLOGY

The following relates generally to wireless communications and more specifically to message repetition for a random access procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support message repetition for a random access procedure. Generally, the described techniques provide for a more robust random access procedure between a user equipment (UE) and a base station when a communication link between the UE and the base station is in a low connectivity condition (e.g., associated with a low link budget threshold). In some wireless communications systems, a UE may attempt to connect to a base station using a random access procedure and may transmit a random access request to the base station. The base station may respond to the random access request by transmitting, to the UE, control information associated with a random access response (RAR) during an RAR window. The base station may identify a current portion of the RAR window and may transmit the control information based on which portion of the RAR window the random access procedure is operating within. During a first portion of the RAR window, the base station may transmit the control information without repetition, while, during a second portion of the RAR window, the base station may transmit the control information with repetition according to a configuration of the RAR window. During the second portion, the UE may receive multiple transmissions of the control information and may combine the multiple transmissions prior to decoding and performing a parity check. The UE may decode the combination of the multiple transmissions and identify a location for receiving the RAR.

A method for wireless communication at a user equipment is described. The method may include identifying that a random access procedure is operating within a portion of a window for communicating a random access response where the portion of the window is configured for repeatedly providing control information associated with the random access response in multiple slots, monitoring, during the portion of the window, a set of slots for instances of the control information based on identifying that the random access procedure is operating within the portion of the window configured for repeatedly providing the control information in multiple slots, combining the instances identified from monitoring the set of slots, and decoding the random access response received as part of the random access procedure based on combining the instances.

An apparatus for wireless communication at a user equipment is described. The apparatus may include a processor, memory coupled with the processor, and instructions stored in the memory. The instructions may be operable, when executed by the processor, to cause the apparatus to identify that a random access procedure is operating within a portion of a window for communicating a random access response where the portion of the window is configured for repeatedly providing control information associated with the random access response in multiple slots, monitor, during the portion of the window, a set of slots for instances of the control information based on identifying that the random access procedure is operating within the portion of the window configured for repeatedly providing the control information in multiple slots, combine the instances identified from monitoring the set of slots, and decode the random access response received as part of the random access procedure based on combining the instances.

Another apparatus for wireless communication at a user equipment is described. The apparatus may include means for identifying that a random access procedure is operating within a portion of a window for communicating a random access response where the portion of the window is configured for repeatedly providing control information associated with the random access response in multiple slots, means for monitoring, during the portion of the window, a set of slots for instances of the control information based on identifying that the random access procedure is operating within the portion of the window configured for repeatedly providing the control information in multiple slots, means for combining the instances identified from monitoring the set of slots, and means for decoding the random access response received as part of the random access procedure based on combining the instances.

A non-transitory computer-readable medium storing code for wireless communication at a user equipment is described. The code may include instructions executable by a processor to identify that a random access procedure is operating within a portion of a window for communicating a random access response where the portion of the window is configured for repeatedly providing control information associated with the random access response in multiple slots, monitor, during the portion of the window, a set of slots for instances of the control information based on identifying that the random access procedure is operating within the portion of the window configured for repeatedly providing the control information in multiple slots, combine the instances identified from monitoring the set of slots, and decode the random access response received as part of the random access procedure based on combining the instances.

Some examples of the method, apparatuses, and non-transitory computer-readable medium described herein may further include operations, features, means, or instructions for identifying that the portion of the window configured for repeatedly providing the control information in multiple slots occurs after a length of the window indicated by a system information may have expired, where monitoring the set of slots may be based on the identifying.

Some examples of the method, apparatuses, and non-transitory computer-readable medium described herein may further include operations, features, means, or instructions for identifying that the portion of the window configured for repeatedly providing the control information in multiple slots occurs during at least a second portion of a length of the window indicated by system information, where monitoring the set of slots may be based on the identifying.

Some examples of the method, apparatuses, and non-transitory computer-readable medium described herein may further include operations, features, means, or instructions for receiving system information that includes an indicator of a configuration of the window, where identifying that that the random access procedure may be operating within the portion of the window may be based on receiving the system information that includes the indicator.

Some examples of the method, apparatuses, and non-transitory computer-readable medium described herein may further include operations, features, means, or instructions for identifying an index value of the configuration included in the system information, and retrieving information about the configuration of the window based on identifying the index value, where identifying that the random access procedure may be operating within the portion of the window may be based on retrieving the information.

Some examples of the method, apparatuses, and non-transitory computer-readable medium described herein may further include operations, features, means, or instructions for identifying information about a repetition level associated with each portion of the window for communicating random access responses included in the system information, where identifying that the random access procedure may be operating within the portion of the window may be based on identifying the information.

Some examples of the method, apparatuses, and non-transitory computer-readable medium described herein may further include operations, features, means, or instructions for identifying the configuration of the window for communicating the random access response as part of the random access procedure based on receiving the system information that includes the indicator, where identifying that that the random access procedure may be operating within the portion of the window may be based on identifying the configuration.

In some examples of the method, apparatuses, and non-transitory computer-readable medium described herein, the system information includes a second indicator for indicating a length of the window different than the indicator.

In some examples of the method, apparatuses, and non-transitory computer-readable medium described herein, the indicator of the configuration of the window may be included in a second indicator for indicating a length of the window.

In some examples of the method, apparatuses, and non-transitory computer-readable medium described herein, the indicator of the system information for indicating the configuration of the window includes one or more bits.

In some examples of the method, apparatuses, and non-transitory computer-readable medium described herein, the system information includes a system information block or a master information block.

Some examples of the method, apparatuses, and non-transitory computer-readable medium described herein may further include operations, features, means, or instructions for identifying a location of the random access response in a data channel based on combining the instances of the control information, where decoding the random access response may be based on identifying the location of the random access response in the data channel.

In some examples of the method, apparatuses, and non-transitory computer-readable medium described herein, the control information may be conveyed by a physical downlink control channel and describes information about the random access response that may be conveyed by a physical downlink shared channel.

Some examples of the method, apparatuses, and non-transitory computer-readable medium described herein may further include operations, features, means, or instructions for identifying that the random access procedure may be operating within a second portion of the window that may be configured for transmitting a single instance of the control information of the random access response, and monitoring, during the second portion of the window, a second set of slots for the single instance of the control information based on identifying that the random access procedure may be operating within the second portion of the window, where identifying that the random access procedure may be operating within the portion of the window may be based on monitoring the second set of slots for the single instance of the control information.

Some examples of the method, apparatuses, and non-transitory computer-readable medium described herein may further include operations, features, means, or instructions for performing a parity check on the control information generated from combining the instances, where decoding the random access response may be based on performing the parity check.

Some examples of the method, apparatuses, and non-transitory computer-readable medium described herein may further include operations, features, means, or instructions for initiating the random access procedure, and transmitting, to a base station, a random access request, where monitoring the set of slots may be based on transmitting the random access request.

Some examples of the method, apparatuses, and non-transitory computer-readable medium described herein may further include operations, features, means, or instructions for transmitting, to a base station, a radio resource control connection request based on decoding the random access response.

In some examples of the method, apparatuses, and non-transitory computer-readable medium described herein, the instances combined after monitoring the set of slots include similar or identical copies of the control information.

In some examples of the method, apparatuses, and non-transitory computer-readable medium described herein, the window further may include operations, features, means, or instructions for a first portion for transmitting a single instance of the control information, and a second portion for transmitting repeating instances of the control information in multiple slots according to a first repetition level.

In some examples of the method, apparatuses, and non-transitory computer-readable medium described herein, the window further may include operations, features, means, or instructions for a third portion for transmitting repeating instances of the control information in multiple slots according to a second repetition level different than the first repetition level.

In some examples of the method, apparatuses, and non-transitory computer-readable medium described herein, a repetition level associated with the portion of the window includes a numerical quantity of multiple slots for repeating the control information.

In some examples of the method, apparatuses, and non-transitory computer-readable medium described herein, the random access response includes a message2 of the random access procedure.

Some examples of the method, apparatuses, and non-transitory computer-readable medium described herein may further include operations, features, means, or instructions for identifying a repetition level associated with the instances for combining or an index associated with the instances for combining, where combining the instances may be based on identifying the repetition level or the index of the instances for combining.

In some examples of the method, apparatuses, and non-transitory computer-readable medium described herein, the instances that may be combined may have a same repetition level or may have a same index.

In some examples of the method, apparatuses, and non-transitory computer-readable medium described herein, the multiple slots may be consecutive slots.

A method for wireless communication at a base station is described. The method may include identifying that a random access procedure is operating within a first portion of a window for communicating a random access response where the first portion of the window is configured for transmitting a single instance of control information of the random access response, transmitting, during the first portion of the window, the single instance of the control information based on identifying that the random access procedure is operating within the first portion of the window, identifying that the random access procedure is operating within a second portion of the window that is configured for transmitting repeating instances of the control information of the random access response in multiple slots, and transmitting, during the second portion of the window, the control information in a first slot and in a second slot after the first slot based on identifying that the random access procedure is operating within the second portion of the window.

An apparatus for wireless communication at a base station is described. The apparatus may include a processor, memory coupled with the processor, and instructions stored in the memory. The instructions may be operable, when executed by the processor, to cause the apparatus to identify that a random access procedure is operating within a first portion of a window for communicating a random access response where the first portion of the window is configured for transmitting a single instance of control information of the random access response, transmit, during the first portion of the window, the single instance of the control information based on identifying that the random access procedure is operating within the first portion of the window, identify that the random access procedure is operating within a second portion of the window that is configured for transmitting repeating instances of the control information of the random access response in multiple slots, and transmit, during the second portion of the window, the control information in a first slot and in a second slot after the first slot based on identifying that the random access procedure is operating within the second portion of the window.

Another apparatus for wireless communication at a base station is described. The apparatus may include means for identifying that a random access procedure is operating within a first portion of a window for communicating a random access response where the first portion of the window is configured for transmitting a single instance of control information of the random access response, means for transmitting, during the first portion of the window, the single instance of the control information based on identifying that the random access procedure is operating within the first portion of the window, means for identifying that the random access procedure is operating within a second portion of the window that is configured for transmitting repeating instances of the control information of the random access response in multiple slots, and means for transmitting, during the second portion of the window, the control information in a first slot and in a second slot after the first slot based on identifying that the random access procedure is operating within the second portion of the window.

A non-transitory computer-readable medium storing code for wireless communication at a base station is described. The code may include instructions executable by a processor to identify that a random access procedure is operating within a first portion of a window for communicating a random access response where the first portion of the window is configured for transmitting a single instance of control information of the random access response, transmit, during the first portion of the window, the single instance of the control information based on identifying that the random access procedure is operating within the first portion of the window, identify that the random access procedure is operating within a second portion of the window that is configured for transmitting repeating instances of the control information of the random access response in multiple slots, and transmit, during the second portion of the window, the control information in a first slot and in a second slot after the first slot based on identifying that the random access procedure is operating within the second portion of the window.

Some examples of the method, apparatuses, and non-transitory computer-readable medium described herein may further include operations, features, means, or instructions for identifying that the second portion of the window configured for repeatedly providing the control information in multiple slots occurs after a length of the window indicated by system information may have expired based on a configuration of the window, where transmitting the control information in the first slot and the second slot may be based on the identifying.

Some examples of the method, apparatuses, and non-transitory computer-readable medium described herein may further include operations, features, means, or instructions for identifying that the second portion of the window configured for repeatedly providing the control information in multiple slots occurs during at least a third portion of a length of the window indicated by system information based on a configuration of the window, where transmitting the control information in the first slot and the second slot may be based on the identifying.

Some examples of the method, apparatuses, and non-transitory computer-readable medium described herein may further include operations, features, means, or instructions for identifying a configuration of the window for communicating the random access response as part of the random access procedure, the configuration of the window including at least one portion for repeatedly providing the control information of the random access response in multiple slots, where identifying that the random access procedure may be operating within the first portion of the window may be based on identifying the configuration.

Some examples of the method, apparatuses, and non-transitory computer-readable medium described herein may further include operations, features, means, or instructions for transmitting system information that includes an indicator of a configuration of the window for communicating the control information of the random access response, where identifying that the random access procedure may be operating within the first portion of the window may be based on transmitting the system information.

Some examples of the method, apparatuses, and non-transitory computer-readable medium described herein may further include operations, features, means, or instructions for identifying an index value of the configuration, where the indicator of the configuration of the window included in the system information includes the index value.

In some examples of the method, apparatuses, and non-transitory computer-readable medium described herein, the system information includes a second indicator for indicating a length of the window different than the indicator.

In some examples of the method, apparatuses, and non-transitory computer-readable medium described herein, the indicator of the configuration of the window may be included in a second indicator for indicating a length of the window.

In some examples of the method, apparatuses, and non-transitory computer-readable medium described herein, the indicator of the system information for indicating the configuration of the window includes one or more bits.

In some examples of the method, apparatuses, and non-transitory computer-readable medium described herein, the system information includes a system information block or a master information block.

Some examples of the method, apparatuses, and non-transitory computer-readable medium described herein may further include operations, features, means, or instructions for identifying that a timer associated with the first portion of the window may have expired and that a message may have not been received from a user equipment before the timer may have expired, where identifying that the random access procedure may be operating within the second portion may be based on the identifying.

In some examples of the method, apparatuses, and non-transitory computer-readable medium described herein, the message includes a message3 of the random access procedure.

Some examples of the method, apparatuses, and non-transitory computer-readable medium described herein may further include operations, features, means, or instructions for identifying information about a repetition level for repeating transmissions of the control information associated with each portion of the window, where an indicator of a configuration of the window included in system information includes the information.

Some examples of the method, apparatuses, and non-transitory computer-readable medium described herein may further include operations, features, means, or instructions for receiving a radio resource control connection request based on transmitting the control information in the first slot and in the second slot after the first slot during the second portion of the window, and advancing the random access procedure based on receiving the radio resource control connection request.

Some examples of the method, apparatuses, and non-transitory computer-readable medium described herein may further include operations, features, means, or instructions for identifying that the base station may be operating in a connectivity condition that satisfies a signal quality threshold, where identifying that the random access procedure may be operating within the first portion of the window may be based on identifying that the base station may be operating in the connectivity condition that satisfies the signal quality threshold.

Some examples of the method, apparatuses, and non-transitory computer-readable medium described herein may further include operations, features, means, or instructions for receiving, from a user equipment, a random access request, where transmitting the control information may be based on receiving the random access request.

In some examples of the method, apparatuses, and non-transitory computer-readable medium described herein, the first portion of the window may be for transmitting the single instance of the control information, and the second portion of the window may be for transmitting repeating instances of the control information in multiple slots according to a first repetition level.

In some examples of the method, apparatuses, and non-transitory computer-readable medium described herein, the window further may include operations, features, means, or instructions for a third portion for transmitting repeating instances of the control information in multiple slots according to a second repetition level different than the first repetition level.

In some examples of the method, apparatuses, and non-transitory computer-readable medium described herein, a repetition level associated with the second portion of the window includes a numerical quantity of multiple slots for repeating the control information.

In some examples of the method, apparatuses, and non-transitory computer-readable medium described herein, the random access response includes a message2 of the random access procedure.

In some examples of the method, apparatuses, and non-transitory computer-readable medium described herein, the multiple slots may be consecutive slots and the second slot includes a consecutive slot after the first slot.

In some examples of the method, apparatuses, and non-transitory computer-readable medium described herein, the instances of the control information transmitted in the first slot and the second slot include identical copies of the control information.

DETAILED DESCRIPTION

Figure 1:
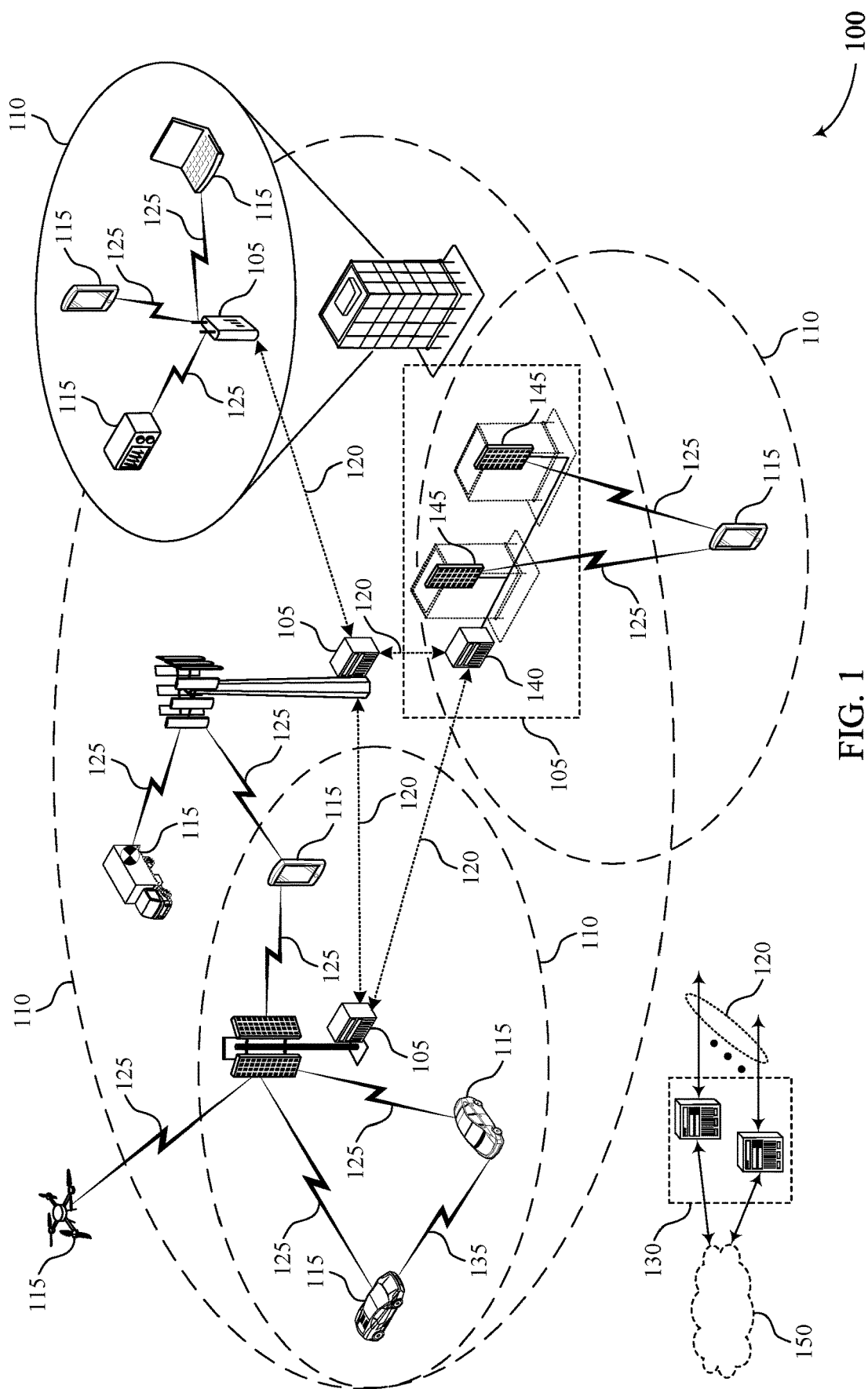
FIG. 1 illustrates an example of a wireless communications system that supports message repetition for a random access procedure in accordance with aspects of the present disclosure.

A first device, such as a user equipment (UE), may attempt to connect to a second device, such as a base station, using a random access procedure. A communication link between the first device and the second device may be associated with a link budget (e.g., a link budget threshold or link margin), which may be based on a number of transmission parameters and environmental factors. As demand for communication resources increases due to an increasing number of wireless devices communicating over the available spectrum, techniques to efficiently and reliably increase throughput are desirable. In some cases, additional frequency ranges may be used by communicating devices, which may enable devices to achieve higher throughput. Higher frequency ranges (e.g., such as frequency ranges used in FR2, including millimeter wave (mmW) frequency ranges) may be implemented for wireless communications, where transmitting at these higher frequencies involves transmitting at shorter wavelengths. Such shorter wavelengths may be susceptible to greater path losses, which may adversely affect the link budget threshold (e.g., the link margin) of the communication link. This may lead to an increase in communication failures.

A UE may attempt to connect to a base station using a random access procedure. The UE may transmit a random access request to the base station (e.g., a message 1 or msg 1). For example, the UE may transmit a physical random access channel (PRACH) preamble to the base station indicating the resource requirement of the UE to initiate the random access procedure. The base station may acknowledge the random access request by transmitting a message 2 (or msg 2) to the UE. The message 2 may include control information and a random access response (RAR) and the UE may expect to receive the message 2 during a time window (e.g., an RAR window). The base station may transmit the control information via a physical downlink control channel (PDCCH) to indicate a location (e.g., a frequency and a time) over which the UE may receive the RAR via a physical downlink shared channel (PDSCH). In some cases, the UE and the base station may be in a low connectivity condition based on a link budget threshold associated with the communication link between the UE and the base station. For example, the UE and the base station may communicate using higher frequency ranges (e.g., mmW frequency ranges such as FR2) such that transmissions over the communication link may experience greater path losses. Further, the base station may transmit the control information via a PDCCH using a relatively wide beam width based on a number of synchronization signal blocks (SSBs) associated with the PDCCH transmission. Additionally, the UE and the base station may be in a low connectivity condition for a variety of other reasons, such as environmental factors (e.g., separation distance, signal obstruction, etc.). Such conditions may result in an increase in communication failures over the communication link. For example, the UE may be unable to successfully receive (and decode) the control information transmitted by the base station and, likewise, may be unable to receive the RAR from the base station. In such examples, the random access procedure may fail and the UE and the base station may be unable to establish a communication link.

In some examples of the present disclosure, the UE and the base station may support a reconfigured RAR window that may increase the likelihood of the UE to successfully receive the control information. For example, the base station may configure an RAR window to increase the chance that the UE may successfully receive and decode the control information. The base station may configure the RAR window to enable a first portion of the RAR window to support communication of single instances of the control information and a second portion of the RAR window to support communication of repeating instances of the control portion. During the second portion of the RAR window, the UE may identify and combine (e.g., using soft-combining) multiple instances of the control information to improve the likelihood of the UE to successfully decode the control information and identify the location of the RAR.

The base station may signal the RAR window configuration via a system information, such a system information block (SIB) or a master information block (MIB). Additionally or alternatively, the base station may signal the RAR window configuration via a physical broadcast channel (PBCH). The signaling may include information indicating a partitioning of the RAR window into two or more portions or an extension of the length of the RAR window. Based on the signaling, the UE may identify the RAR window configuration (e.g., either explicitly indicated by the system information or from a look up table (LUT)), and may provide reception opportunities for the control information based on the configuration.

The UE may identify a number of repetitions, a repetition level, an index, a location, or any other information of the control information that may enable the UE to determine which transmissions may be instances of the control information such that the UE may know which transmissions to combine within each portion. In some examples, the UE may combine the multiple transmissions of the control information according to the signaling and may attempt to decode the combined transmissions. In some cases, combining multiple transmissions of the control information may increase the likelihood that the UE will successfully decode the control information and likewise increase the chance that the UE will receive the RAR of the message 2.

Particular aspects of the subject matter described herein may be implemented to realize one or more advantages. The described techniques may support a more robust random access procedure based on increasing the likelihood that a device may successfully receive the control information associated with an RAR during an RAR window during low connectivity conditions. Further, a device implementing the techniques of the present disclosure may achieve power savings by reducing the number of repeats of the random access procedure before successfully connecting to a serving base station. Additionally, the device may identify an RAR window configuration for receiving the control information and may employ a soft-combining technique to increase the likelihood that the device may decode the control information and identify a location to receive the RAR (e.g., the PDSCH), which may increase the likelihood for a successful random access connection. As such, supported techniques may include improved network operations and efficiencies, among other benefits.

Aspects of the disclosure are initially described in the context of wireless communications systems. Aspects of the disclosure are additionally described in the context of a process flow, window configurations, and a repetition schedule. Aspects of the disclosure are further illustrated by and described with reference to apparatus diagrams, system diagrams, and flowcharts that relate to message repetition for a random access procedure.

FIG. 1 illustrates an example of a wireless communications system 100 that supports message repetition for a random access procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel instances in one or more repetition levels arranged in a cascaded manner. A repetition level for a control channel instance may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on.

These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some examples of the present disclosure, a base station 105 may configure an RAR window (e.g., a time window) as part of a random access procedure during which a UE 115 may expect to receive a message 2 (e.g., an RAR). Within an RAR window, the base station 105 may transmit control information associated with the RAR to the UE 115. In some cases, the control information may include the location (e.g., the time and frequency resources) of the RAR and the UE 115 may use the control information to determine how to receive the RAR from the base station 105. In some implementations, the RAR window configuration may be based on a partition or an extension of the RAR window, where two or more portions of the RAR window may be configured for different types of control information transmissions. In some examples, the different types of control information transmissions may be associated with different transmission patterns (e.g., different repetition levels). For example, the base station 105 may transmit control information associated with an RAR with different repetition levels based on which portion of the RAR window a random access procedure is operating within.

The RAR window may be contiguous or non-contiguous. For example, two portions of the RAR window may be attached together without any gap in time. Additionally or alternatively, there may be some time gap between two portions of the RAR window. As such, an RAR window with a number of portions may feature no time gaps between each of the number of portions, a time gap between each of the number of portions, or a combination of no time gaps between some portions and a time gap between some other portions. This time gap may be defined in the standard specifications or may be configured during the configuration of the RAR window.

In some implementations, the base station 105 may identify that the random access procedure is operating within a first portion of the RAR window and may determine to transmit one or more single instances of the control information based on the random access procedure operating within the first portion of the RAR window. Likewise, the UE 115 may identify that the random access procedure is operating within the first portion of the RAR and may provide reception opportunities for single instances of the control information based on identifying that the random access procedure is operating within the first portion of the RAR window. In some cases, however, the UE 115 and the base station 105 may be in a low connectivity condition (e.g., based on an insufficient link budget threshold or link margin) such that the UE 115 may fail to successfully receive (and decode) the single instances of the control information. Additionally or alternatively, the base station 105 may transmit a signal using a transmit beam based on a number of SSBs associated with the transmission. During initial access, the base station 105 may transmit a signal over a PDCCH associated with a number of SSBs such that the base station 105 may use a wider beam width for the PDCCH transmission. In some cases, a wider beam width may result in a lower received signal strength at the UE 115, compared to a narrower beam width, which may reduce the link budget threshold of the communication link 125.

In some examples, UE 115 and the base station 105 may identify that the random access procedure is operating within a second portion of the RAR window (e.g., where the second portion follows the first portion in time). The base station 105 may configure the RAR window such that the second portion of the RAR window supports repeatedly transmitting instances of the control information. Accordingly, the base station 105 may repeatedly transmit instances of the control information during the second portion of the RAR window. For example, the base station 105 may transmit a first instance of the control information in a first slot and may transmit a second instance of the control information in a second slot that follows the first slot in time (e.g., the first slot and the second slot may be two consecutive slots).

Similarly, the UE 115 may identify that the random access procedure is operating within the second portion of the RAR window and may monitor a number of slots for the repeating instances of the control information. In some examples, the UE 115 may, using the information included in the system information received from the base station 105, identify a number of repetitions of the control information, a repetition level of the control information, an index of the control information, a location of the control information, or any other information that may enable the UE 115 to identify which instances (e.g., candidates) of the control information may belong to the same control information repetition pattern (e.g., which control information instances may be repeats of each other). Based on the information included in the system information, the UE 115 may identify a number of instances and may combine the control information instances that are repeats of each other (e.g., the control information instances may include similar or identical copies of the control information). In some examples, the UE 115 may decode the combination of control information instances in order to determine the location of the RAR.

Figure 2:
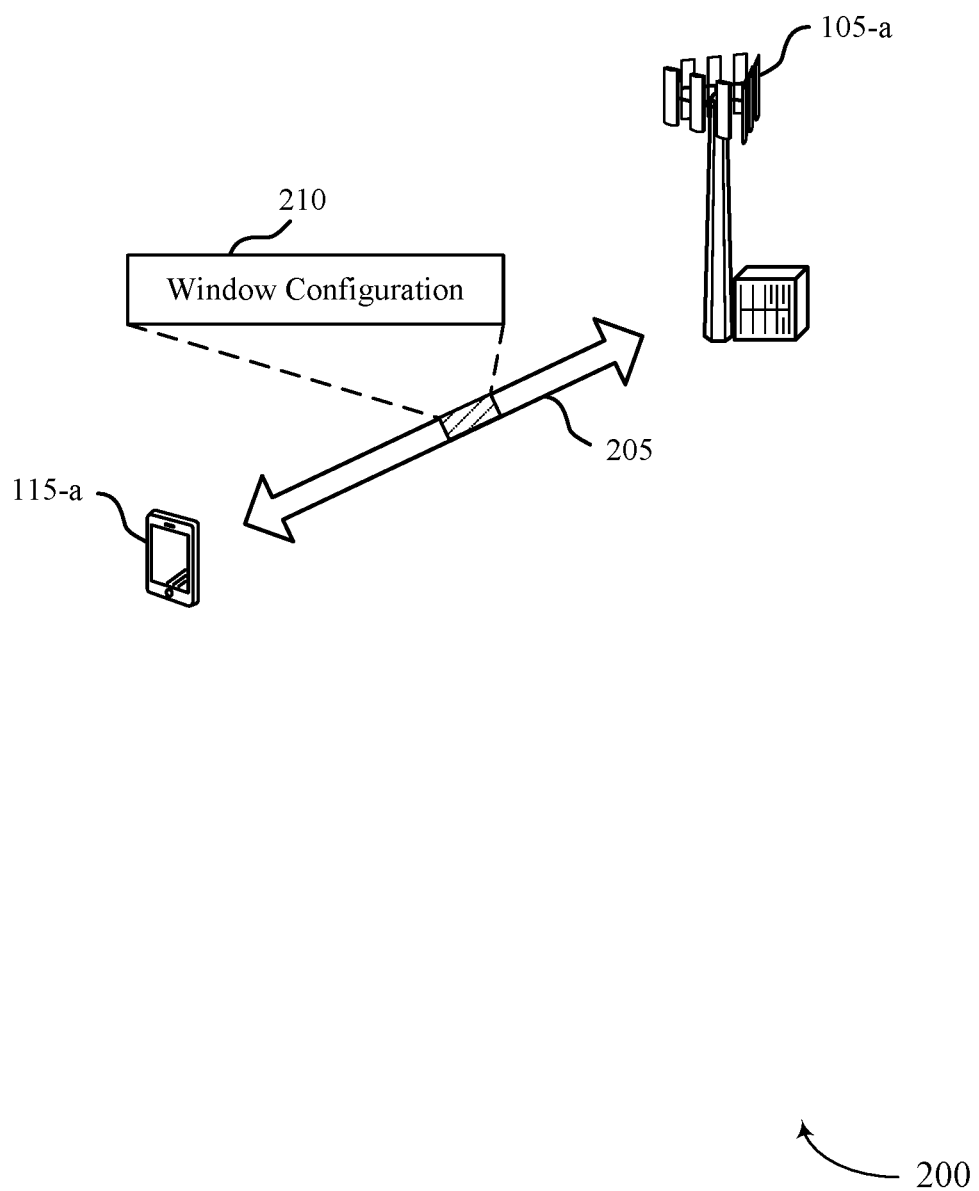
FIG. 2 illustrates an example of a wireless communications system that supports message repetition for a random access procedure in accordance with aspects of the present disclosure.

FIG. 2 illustrates an example wireless communications system 200 that supports message repetition for a random access procedure in accordance with aspects of the present disclosure. In some examples, the wireless communications system 200 may implement aspects of the wireless communications system 100. In some cases, the wireless communications system 200 may include a UE 115-a and a base station 105-a, which may be examples of UEs 115 and base stations 105 described with reference to FIG. 1. The UE 115-a and the base station 105-a may communicate over a communication link 205. In some examples, the wireless communications system 200 (e.g., a 5G or an NR system that supports high frequency communications, such as FR2) may support enhancements for random access procedures at both ends of a communication link 205 (e.g., for both a UE 115 and a base station 105).

In some cases, the UE 115-*a* may not be connected to a serving base station (e.g., such as the base station 105-*a*), and may initiate a random access procedure to attempt to connect to the base station 105-*a*. The UE 115-*a* may receive system information (e.g., via a SIB, such as SIB1 or SIB2) from the base station 105-*a* via a broadcast message (e.g., via a PBCH) and may identify configuration information associated with the random access procedure based on the system information. For example, the base station 105-*a* may broadcast information about a set of resources or a power level that may be used by a connecting UE 115-*a* during the random access procedure. Additionally, the base station 105-*a* may broadcast, via the system information, an RAR window length that the connecting UE 115-*a* may monitor for RAR. In some cases, the base station 105-*a* may indicate the RAR window length via an indicator in the system information.

The UE 115-*a* may transmit a random access request to the base station 105-*a* to initiate the random access procedure, which may include a PRACH preamble and a radio network temporary identifier (RNTI), such as a random access RNTI (RA-RNTI). The UE 115-*a*, using the random access request, may indicate information to the base station 105-*a* about its resource requirement or capability. The base station 105-*a* may receive the random access request from the UE 115-*a* and may respond by transmitting an RAR. In some cases, the UE 115-*a* may expect to receive the RAR within the RAR window indicated by the system information broadcast by the base station 105-*a*. During the RAR window, the base station 105-*a* may transmit control information conveyed by a control channel (e.g., a PDCCH) that may indicate, to the UE 115-*a*, the location (e.g., the time and frequency resources) of the RAR conveyed by a data channel (e.g., a PDSCH).

In some cases, the base station 105-*a* may transmit a number of single instances of the control information during a number of slots included in the RAR window length. In such cases, the UE 115-*a* may attempt to receive and decode each instance of the control information independently. For example, if the UE 115-*a* is unable to receive and decode a first instance of the control information, the UE 115-*a* may discard the unsuccessfully received or decoded control information and may attempt to receive and decode a second instance of the control information without storing any information associated with the first instance. This process may repeat for a monitoring occasion of each slot for the length of the RAR window until the UE 115-*a* successfully receives and decodes a control information transmission or until the RAR window length expires.

Upon successful reception of the control information, the UE 115-*a* may decode the control information and perform a parity check (e.g., a cyclic redundancy check (CRC)) on the control information. Based on performing the parity check, the UE 115-*a* may determine that the control information is relevant to an RAR from the base station 105-*a*. In cases in which the decoding and the parity check are successful and the random access response is decoded, the UE 115-*a* may transmit a message 3 (e.g., a radio resource control (RRC) connection request) to the base station 105-*a* and the random access procedure may advance (e.g., the random access procedure may advance to a next step).

In some cases, the communication link 205 between the UE 115-*a* and the base station 105-*a* may be associated with a link budget threshold (e.g., a link margin) based on the link characteristics of the communication link 205. For example, a path loss, a received signal strength, or other characteristics may influence the link budget threshold of the communication link 205. As wireless communications systems, such as the wireless communications system 200, aim to more efficiently and reliably increase throughput, additional frequency ranges may be used by communicating devices (such as the UE 115-*a* and the base station 105-*a*), which may enable devices to achieve higher throughput. Higher frequency ranges (e.g., such as frequency ranges used in FR2, including mmW frequency ranges) may be implemented for wireless communications, where transmitting at these higher frequencies involves transmitting at shorter wavelengths. In some wireless communications systems, the designations FR1 and FR2 may refer to frequency ranges that are available for communicating using the wireless communications system. For example, FR1 may refer to a frequency range between approximately 450 MHz and approximately 7,125 MHz and FR2 may refer to a frequency range between approximately 24,250 MHz and approximately 52,600 MHz. Shorter wavelengths may be susceptible to greater path losses, which may adversely affect the link budget threshold (e.g., the link margin) of the communication link 205. Further, the base station 105-*a* may employ a relatively wide transmit beam for transmissions to the UE 115-*a*. For example, the beamwidth of the transmit beam of the base station 105-*a* may be based on (e.g., proportional to) the number of SSBs associated with the transmissions of the base station 105-*a*. Based on receiving signals via a beam with a relatively wide beamwidth, the UE 115-*a* may experience a lower received signal strength, which may also adversely affect the link budget threshold. In some cases, the link budget threshold may fall below a threshold value, which may result in an increase in communication failures over the communication link 205.

In some examples, the base station 105-*a* may identify that the link budget threshold is below a threshold value and, accordingly, determine that the base station 105-*a* is operating in a low connectivity condition with the UE 115-*a*. In such examples, the control information associated with the RAR from the base station 105-*a* may have a lower likelihood of successful reception by the UE 115-*a* (e.g., based on the low connectivity and poor link conditions). If the control information cannot be successfully decoded, the UE 115-*a* may be unable to determine the location of the RAR and, accordingly, may be unable to transmit an RRC connection request, which may result in an unsuccessful termination of the random access procedure. In such scenarios, the UE 115-*a* may restart the random access procedure by retransmitting the random access request and monitoring a number of slots again for the single instances of the control information.

In some examples of the present disclosure, the UE 115-*a* and the base station 105-*a* may achieve a higher likelihood for successful completion of a random access procedure during low connectivity conditions by combining (e.g., using soft-combining) instances of the control information transmissions. However, some random access configurations (e.g., some RAR window configurations) may not support combining techniques implemented by the UE 115-*a*. As described herein, a configurable RAR window may be defined to enable a UE 115-*a* to combine multiple instances of the control information associated with the RAR during the RAR window and to decode and perform a parity check of the combined instances of the control information.

In some implementations, the base station 105-*a* may configure an RAR window configuration to support combining multiple repetitions of the control information associated with the RAR. In some examples, the base station 105-*a* may partition an initial (e.g., a default) RAR window length into two or more portions, where each portion may be associated with a different type of control information transmission pattern (e.g., a different repetition level). Additionally or alternatively, the base station 105-a may append one or more additional RAR window length segments to the initial RAR window length and may configure the additional segments to support repeatedly transmitting instances of the control information. The portions of the initial RAR window length may be time intervals within the initial RAR window length (e.g., an initial time window for the RAR). Similarly, the appended segments to an initial RAR window length may be additional time intervals appended to the initial time window for the RAR, effectively extending the time window for an RAR.

The base station 105-a may transmit the RAR window configuration via a window configuration 210 to the UE 115-a. In some examples, the base station 105-a may transmit the window configuration 210 as part of a system information broadcast transmission (e.g., the window configuration 210 may be transmitted via a SIB or a MIB via a PBCH, a broadcast control channel (BCCH), or a broadcast channel (BCH), or a combination thereof) that may be received by the UE 115-a. Accordingly, the UE 115-a may attempt to connect to the base station 105-a using a random access procedure and may know to use the RAR window configuration indicated by the window configuration 210. The window configuration 210 may be an example of an indicator included in the system information. For example, the UE 115-a may receive the window configuration 210 and identify the RAR window configuration based on identifying the indicator included in the window configuration 210. In some implementations, the indicator may include an explicit configuration of the RAR window, while in some other examples the indictor may correspond to an entry (e.g., an index) in a LUT or memory that the UE 115-a may use to identify the RAR window configuration. For example, the window configuration 210 may include an index value and the UE 115-a may identify information about the RAR window configuration based on the index value (e.g., based on referencing the index value in a set of preconfigured RAR window configurations known to the UE 115-a).

In some examples, the UE 115-a may monitor a number of slots for control information transmissions associated with the RAR based on the RAR window configuration received via the window configuration 210. For example, the UE 115-a may identify a number of repetitions of the control information, a repetition level of the control information, an index of the control information, a location of the control information, or any other information that may enable the UE 115-a to identify which instances of a control information transmission may be paired together (e.g., may be associated with the same RAR) based on the window configuration 210. Based on identifying this information from the window configuration 210, the UE 115-a may identify a number of control information instances that may be stored and combined with other control information instances. The UE 115-a may effectively increase the received signal strength of the control information transmissions by combining repetitions of the transmissions together, thereby increasing the likelihood of successful decoding.

Figure 3:
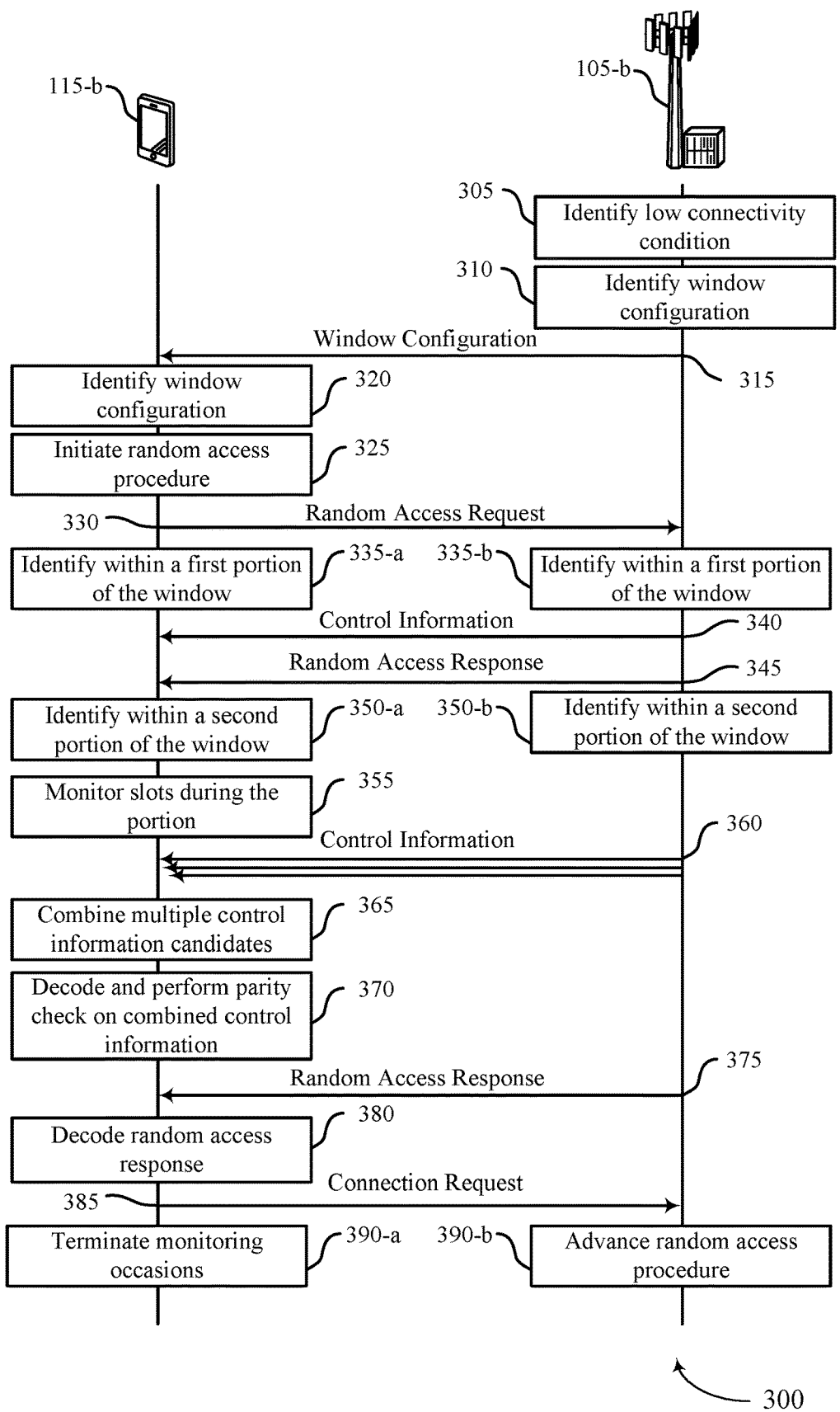
FIG. 3 illustrates an example of a process flow that supports message repetition for a random access procedure in accordance with aspects of the present disclosure.

FIG. 3 illustrates an example of a process flow 300 that supports message repetition for a random access procedure in accordance with aspects of the present disclosure. In some examples, the process flow 300 may implement aspects of the wireless communications system 100 or the wireless communications system 200. The process flow 300 may include a UE 115-b and a base station 105-b, which may be examples of corresponding devices described with reference to FIGS. 1 and 2. The UE 115-b and the base station 105-b may implement one or more techniques for implementing soft-combining of control information transmissions associated with an RAR during a random access procedure between the UE 115-b and the base station 105-b. Alternative examples of the following may be implemented, where some steps are performed in a different order than described or are not performed at all. In some cases, steps may include additional features not mentioned below, or further steps may be added.

At 305, the base station 105-b may identify that the base station 105-b is operating in a lower connectivity condition. For example, the base station 105-b may identify that a link budget threshold of a communication link between the UE 115-b and the base station 105-b (e.g., the communication link 205 described with reference to FIG. 2) is less than a threshold value, which may be associated with an increase in communication failures between the UE 115-b and the base station 105-b. In some examples, the link budget threshold may fall below the threshold value based on a frequency range (e.g., and resulting path losses) of the communication between the UE 115-b and the base station 105-b (e.g., the UE 115-b and the base station 105-b may communicate over relatively high frequency ranges, such as mmW frequency ranges used in FR2) or based on a beam width of the transmitting device (e.g., the base station 105-b may employ a relatively wide beam width, potentially resulting in a lower received signal strength at the UE 115-b).

Additionally, the base station 105-b may identify that the base station 105-b is operating in the low connectivity condition based on a number of previous communication failures resulting from a variety of additional factors that may influence the link budget threshold (e.g., link obstruction by an object, separation distance, or other environmental factors). In cases in which the base station 105-b identifies that a low connectivity condition applies, the base station 105-b may determine or predict that a random access procedure between the UE 115-b and the base station 105-b may be unsuccessful. For example, based on identifying a low connectivity condition applies to current operations, the base station 105-b may determine or predict that single instances of control information transmissions during an RAR window may be received by the UE 115-b with an insufficient signal quality (e.g., a low signal-to-noise ratio (SNR), a low received signal strength, etc.) such that the UE 115-b may be unable to successfully receive and decode individual instances of the control information. Accordingly, the base station 105-b may determine that the UE 115-b will be unable to identify the location of the RAR and unable to advance the random access procedure.

At 310, the base station 105-b may identify a configuration of an RAR window for communicating the RAR as part of a random access procedure based on identifying that the base station 105-b is operating in a low connectivity condition. For example, the base station 105-b may identify an RAR window configuration such that the UE 115-b may experience a greater likelihood to successfully receive control information associated with the RAR and, accordingly, may be more likely to receive the RAR and advance the random access procedure. In some cases, the UE 115-b may more successfully receive and decode transmissions (e.g., instances of control information) based on employing a combining technique (e.g., soft-combining) that combines two or more transmissions together prior to decoding. Accordingly, in some examples, the base station 105-b may identify an RAR window configuration that includes at least one portion for transmitting multiple instances of control information and during which the UE 115-b may use combining techniques to decode the multiple instances of the control information.

In some examples, the at least one portion of the RAR window for repeating multiple instances is appended after an initial RAR window length has expired (e.g., the portion for repeating multiple instances begins upon expiration of the initial RAR window length). For example, the base station 105-b may identify an RAR window configuration that appends one or more additional segments to the initial RAR window length such that there are at least two portions of the RAR window length. As such, the base station 105-b may configure the first portion of the RAR window length to support transmitting single instances of the control information and may configure a second portion of the RAR window length to support transmitting repeating instances of the control information in a number of slots (e.g., a number of consecutive slots according to a repetition level of the second portion).

In some other examples, the RAR window may be partitioned such that the initial (e.g., the default) RAR window length includes two portions (e.g., a first portion for providing single instances of the control information and a second portion for providing repeating instances of the control information). In some implementations, the base station 105-b may identify the RAR window configuration from a preconfigured set of RAR window configurations (e.g., based on a LUT or a number of mappings at the UE 115-b) or the base station 105-b may determine the RAR window configuration (e.g., without restriction to a preconfigured set). In examples in which the base station 105-b identifies an RAR window configuration that partitions an initial RAR window length into two or more portions, the base station 105-a may configure a first portion of the RAR window length to support transmitting single instances of the control information and may configure a second portion of the RAR window length to support transmitting repeating instances of the control information in a number of slots (e.g., a number of consecutive slots according to a repetition level of the second portion). Further, the base station 105-b may identify an RAR window configuration that both partitions and appends the initial RAR window length to enable the UE 115-b to employ combining techniques.

While the present examples describe partitioning the initial RAR window length into two portions or appending an additional portion to the initial RAR window length, or both, the base station 105-b may configure the RAR window with any number of portions or appended segments within the scope of the present disclosure. Once the base station 105-b identifies the RAR window configuration, the base station 105-b may transmit a window configuration to the UE 115-b to inform the UE 115-b of the RAR window configuration so that both the UE 115-b and the base station 105-b may operate coherently (e.g., so that the UE 115-b knows when and how it may combine instances of control information transmissions from the base station 105-b).

At 315, for example, base station 105-b may transmit the window configuration to the UE 115-b, which may convey the RAR window configuration that may be used during a random access procedure. In some examples, the base station 105-b may transmit the window configuration via system information. For example, the base station 105-b may signal the window configuration by one or more additional bits in a system information bitfield. In some cases, the base station 105-b may signal the window configuration by one or more additional bits in a length bitfield that may define the RAR window length. Additionally or alternatively, the base station 105-b may signal the RAR window configuration by one or more bits in a MIB via a broadcast transmission (e.g., via a PBCH). Likewise, the base station 105-b may also indicate, to the UE 115-b via the window configuration at 315, the number of control information repetitions in each portion of the RAR window by the one or more additional bit in the system information bitfield or the one or more bits in the MIB via the broadcast transmission.

In some implementations, the base station 105-b may explicitly signal the RAR window configuration in the window configuration at 315. In some other implementations, the base station 105-b may transmit an indication of the RAR window configuration that the UE 115-b may use to identify the RAR window configuration (e.g., from a LUT or a memory at the UE 115-b). For example, the base station 105-b may transmit, via the window configuration at 315, an indicator or an index value that the UE 115-b may use as an input into a LUT (e.g., a fixed table) or as an input into one of multiple mapping operations. Accordingly, the UE 115-b may receive the window configuration (e.g., the system information including the window configuration) that includes an indicator or an index value. In some cases, the indicator may include the index value.

At 320, the UE 115-b may identify the RAR window configuration for communicating (e.g., receiving) the RAR as part of a random access procedure based on receiving the system information including the indicator or the index value. In some examples, the UE 115-b may use the indicator or the index value as an input into a LUT or a mapping function, or both, and, using the LUT or the mapping function, or both, may retrieve information about the configuration of the RAR window. Additionally or alternatively, the UE 115-b may use an indicator to otherwise identify the configuration of the RAR window. For example, the indictor may indicate one or more window lengths. For instance, the indictor may indicate an initial (e.g., a default) RAR window length, a number of appended window lengths (e.g., appended window segments), a number of window lengths that partition a larger window length, or a combination thereof.

Based on receiving the window configuration at 315 via system information from the base station 105-b, the UE 115-b may identify the window length and the number of partitions based on an initial RAR window length indicated in the system information and an RAR window configuration indicated in the system information. Additionally, the UE 115-b may identify information about a repetition level associated with each portion of the RAR window. For example, the UE 115-b may identify that the first portion of the RAR window configuration may be associated with single instances of the control information and may not feature any repetition. In some examples, the UE 115-b may identify that the second portion of the RAR window configuration is associated with a repetition level, where the repetition level may include a numerical quantity of slots for repeating the transmission of the control information. In some cases, the repetition level may include a numerical quantity of consecutive slots for repeating the transmission of the control information. In some implementations, the UE 115-b may identify a number of slots that may include control information repetitions (e.g., during the second portion) and a location in each of the number of slots where the control information repetitions may be received. In some cases, the number of slots may be consecutive.

At 325, the UE 115-b may initiate the random access procedure and, at 330, the UE 115-b may transmit a random access request to the base station 105-b. For example, the UE 115-b may be an unserved UE 115-b or may be switching from another base station 105-b and may attempt to connect to the base station 105-b using a random access procedure. The UE 115-b may use a contention-based random access procedure or a contention-free random access procedure. In some cases, the UE 115-b may transmit the random access request to the base station 105-b as part of a random access preamble. The random access request may include a preamble identification (ID) and an RA-RNTI. In some examples, the UE 115-b may use the random access request to initiate the random access procedure and to provide an indication to the base station 105-b about the resource requirement or capability of the UE 115-b. Upon transmission of the random access request, the UE 115-b may expect to receive an RAR during an upcoming RAR window (e.g., according to the RAR window configuration identified at 325).

At 335-a, during the RAR window for communicating an RAR, the UE 115-b may identify that the random access procedure is operating within a first portion of the RAR window. Similarly, at 335-b, the base station 105-b may identify that the random access procedure is operating within the first portion of the RAR window. At 340, based on identifying that the random access procedure is operating within the first portion of the RAR window, the base station 105-b may transmit a single instance of the control information associated with an RAR. In some cases, the control information may include a location (e.g., time and frequency resources) for receiving the RAR.

The UE 115-b may attempt to receive and decode the single instance of the control information and may perform a parity check (e.g., a CRC parity check) on the control information. In some cases, the UE 115-b may successfully receive and decode the control information (e.g., the link budget threshold may be above the threshold value) and identify the location for receiving the RAR. At 345, the base station 105-b may transmit the RAR and the UE 115-b may receive the RAR based on successfully receiving and decoding the control information at 340. In such cases, the UE 115-b may skip to 380, decode the random access response, and may transmit a connection request at 385 to the base station 105-b. Based in part on transmitting the connection request, the UE 115-b may terminate monitoring slots in the RAR window at 390-a and the base station 105-b may advance the random access procedure at 390-b. In this manner, a UE 115-b that is operating in a high connectivity condition (e.g., featuring a communication link with a link budget threshold that is greater than the threshold value) may refrain from monitoring more slots than may be necessary for the UE 115-b to establish a connection with the base station 105-b.

However, in some examples (such as in examples in which the link budget threshold or link margin is below the threshold value), the UE 115-b may be unable to successfully decode the single instance of control information at 340. In such examples, the base station 105-b may transmit a number of instances of control information associated with an RAR throughout a number of slots associated with the first portion of the RAR window and the UE 115-b may attempt to receive and decode each instance of the control information independently. For example, the UE 115-b may unsuccessfully attempt to receive and decode a first instance of the control information in a first slot and may discard the information related to the first instance of the control information based on unsuccessfully receiving and decoding the control information. In some cases, the UE 115-b may repeat the process of discarding instances of control information that were not received and decoded successfully until the first portion of the RAR window expires. For example, the base station may identify that a timer associated with the first portion of the RAR window expired and identify that the base station 105-b has not received a connection request (e.g., a connection request that the UE 115-b may transmit at 385 upon successfully receiving the RAR) indicating that the UE 115-b successfully received the RAR.

Accordingly, the base station 105-b may determine that the UE 115-b was unable to receive the single instances of the control information and may identify that the random access procedure is operating within a second portion of the RAR window at 350-b (e.g., by not receiving a connection request at 385 within a duration). Likewise, the UE 115-b may identify that the random access procedure is operating within the second portion of the RAR window at 350-a based on the RAR window configuration identified at 320 (e.g., by not successfully decoding control information at 340 or a random access response at 345 within a duration). As such, the UE 115-b and the base station 105-b may identify that the random access procedure is operating within a portion of the RAR window configured for repeatedly transmitting control information associated with the RAR.

At 355, the UE 115-b may monitor, during the second portion of the RAR window, a number of slots for instances (e.g., candidates) of the control information based on identifying that the random access procedure is operating within the second portion of the RAR window configured for repeatedly transmitting the control information. In some examples, the number of slots may be consecutive to each other, such that the base station 105-b may transmit a control information instance in each slot for a number of consecutive slots. In some cases, the number (e.g., the numerical quantity) of consecutive slots may be based on a repetition level associated with the second portion of the RAR window. Additionally or alternatively, the UE 115-b may monitor a location in each slot for the control information instances based on the RAR window configuration. Additional information about repetition schedules is described with reference to FIG. 5.

At 360, the base station 105-b may transmit repeating instances of the control information associated with the RAR in a number of slots. For example, the base station 105-b may repeatedly transmit identical copies of the control information associated with the RAR. In some cases, the number of slots may be consecutive. In some examples, according to the RAR window configuration, the base station 105-b may transmit each repeating instance of the control information in the same location of each of the number of consecutive slots (e.g., at the beginning of each slot). Additionally or alternatively, the base station 105-b may link the repeating instances of the control information via a repetition level. For example, the base station 105-b may transmit each instance of the repeating instances of the control information in a same location within a slot or each instance may feature the same repetition level, such that each instance of the control information may have the same number of CCEs included in the control information. Additionally or alternatively, each instance of the repeating instances of the control information may be associated with an index that links the repeating instances together. In some examples, the repeating instances of the control information may all feature the same index. In some other examples, however, the indexes of the repeating instances of the control information may follow a pattern included in the RAR window configuration.

Also at 360, the UE 115-*b* may attempt to receive and decode the repeatedly transmitted instances of the control information. In some cases, the base station 105-*b* may transmit repeating instances of the control information and the UE 115-*b* may monitor for repeating control information instances (e.g., instances of the control information that are linked according to the RAR window configuration). In some examples, the UE 115-*b* may identify a number of control information instances while monitoring the number of slots and store the number of control information instances while monitoring for additional instances. The instances of the control information received by the UE 115-*b* and used for the combining may be similar or identical copies of the instances transmitted by the base station 105-*b*. The copies of the instances received by the UE 115-*b* may have slight differences due to disturbances that occur during communication of the signals that carry the copies of the instances.

At 365, the UE 115-*b* may combine the number of control information instances identified from monitoring the number of slots (e.g., using soft-combining). As described herein, the UE 115-*b* may identify that a number of control information instances may be combined based on the information included in the RAR window configuration (e.g., based on a number of repetitions, a location in each slot, a repetition level, an index, or a combination thereof associated with each of the control information instances). Based on combining the number of control information instances, the UE 115-*a* may effectively increase the received signal strength of the control information transmissions from the base station 105-*b*. For example, the UE 115-*a* may receive a number of partial, incomplete, or partially erroneous control information instances and, after combining, may construct a complete or near-complete control information signal.

At 370, the UE 115-*b* may attempt to decode the combined control information instances. In some examples, the UE 115-*b* may successfully decode the combined control information instances based on constructing a complete or near-complete control information signal from a number of control information instances. Additionally, the UE 115-*b* may perform a parity check on the control information generated from combining the control information instances. In some cases, decoding the control information occurs after performing the parity check. The UE 115-*b* may detect any errors in the control information generated by combining the number of instances and, based on successfully performing the parity check, the UE 115-*b* may identify the location (e.g., time and frequency resources) for an RAR corresponding to the random access request transmitted by the UE 115-*b* at 330.

At 375, the base station 105-*b* may transmit the RAR, and the UE 115-*b* may successfully decode the RAR, based on the resource allocation indicated by the control information. At 380, the UE 115-*b* may decode the RAR. In some cases, the UE 115-*b* may decode the RAR and identify an uplink resource allocation (e.g., an uplink grant) for transmitting a message 3 (e.g., an RRC connection request) that the UE 115-*b* may transmit using a physical uplink shared channel (PUSCH). At 385, the UE 115-*b* may transmit the connection request (e.g., the RRC connection request). Accordingly, the base station 105-*b* may receive the connection request and, at 390-*b*, may advance the random access procedure based on receiving the connection request. Correspondingly, the UE 115-*b*, at 390-*a*, may terminate monitoring the number of slots associated with the second portion of the RAR window based on receiving the RAR and transmitting the connection request (e.g., advancing the random access procedure).

Figure 4A:
FIGS. 4A, 4B, and 4C illustrate examples of window configurations that support message repetition for a random access procedure in accordance with aspects of the present disclosure.
Figure 4A:
Figure 4A:
Figure 4A:
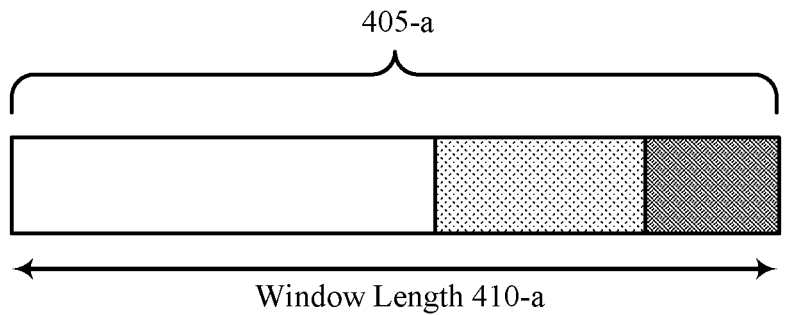
Figure 4B:
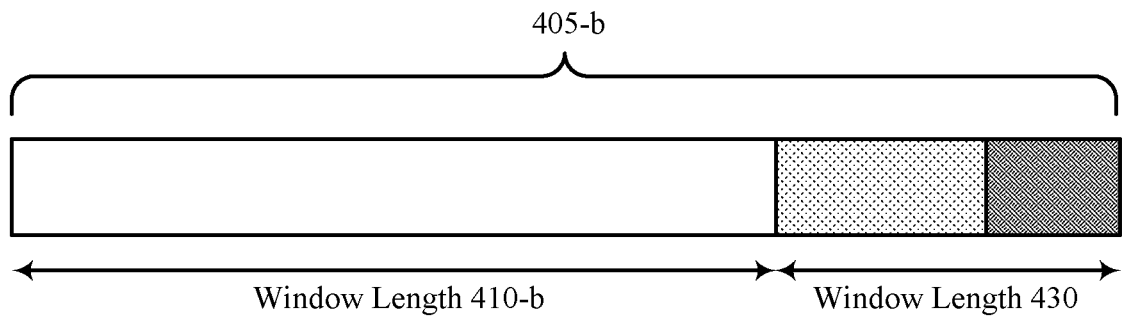
Figure 4C:
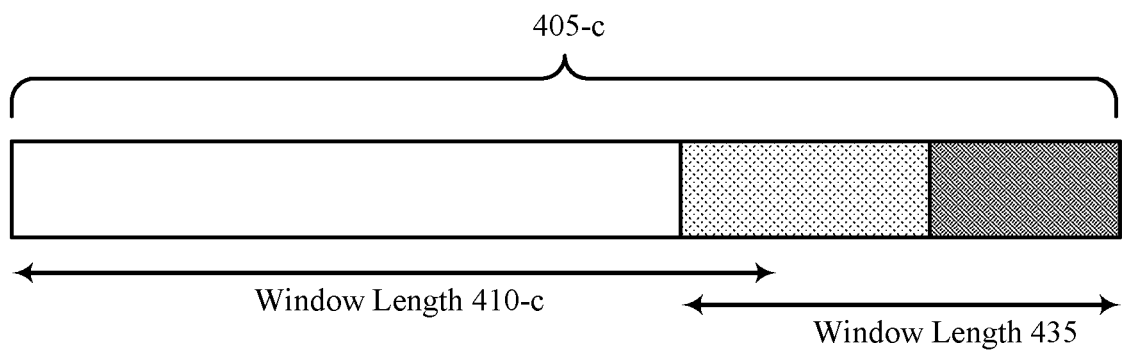

FIGS. 4A, 4B, and 4C illustrate examples of window configurations that support message repetition for a random access procedure in accordance with aspects of the present disclosure. In some examples, the window configurations 405-*a*, 405-*b*, and 405-*c* support partitioning or appending, or both, to an initial (e.g., a default) window length 410 in order to enable a UE 115 to employ soft-combining techniques to increase the likelihood that the UE 115 may successfully receive control information (e.g., PDCCH transmissions) associated with an RAR (e.g., a message 2) during a random access procedure.

In some examples, the base station 105 may broadcast (e.g., via PBCH, BCCH, BCH, etc.) system information to a number of UEs 115. The system information may indicate a variety of information including a length of an RAR window and a configuration of an RAR window. Based on receiving the system information, the number of UEs 115 may identify a window configuration 405 or a length of the window. In some examples, each UE 115 of the number of UEs 115 may perform a random access procedure to connect to the base station 105 according to the same window configuration 405 or the length of the window indicated via the system information.

The window configurations 405-*a*, 405-*b*, and 405-*c* may illustrate three portions as an example, but may include any number of portions without departing from the scope of the present disclosure. For example, a window configuration may include one portion, two portions, three portions, four portions, five portions, six portions, seven portions, eight portions, etc. Each portion may define a different repetition level for the control information associated with the random access response of a random access procedure. In the examples of FIGS. 4A, 4B, and 4C, each window configuration 405 features a first portion 415, a second portion 420, and a third portion 425. In some examples, each portion may support different types of control information transmissions. For example, the first portion 415 may support single instances of control information transmissions associated with an RAR. In some cases, the first portion 415 may relate to the first portion described with reference to FIG. 3, where a base station 105 may transmit single instances of the control information associated with an RAR. The second portion 420 may be configured for repeatedly transmitting control information associated with the RAR. For example, the second portion 420 may be associated with a first number of slots, and the base station 105 may transmit identical copies (sometimes referred to herein as instances) of the control information in each of a second number of slots (e.g., consecutive slots) according to a first repetition level associated with the second portion 420, where the second number of slots may be less than or equal to the first number of slots. The third portion 425 may also be configured for repeatedly transmitting control information associated with the RAR. For example, the third portion 425 may be associated with a third number of slots and the base station 105 may transmit identical copies of the control information in each of a fourth number of slots (e.g., consecutive slots) according to a second repetition level associated with the third portion 425, where the fourth number of slots may be less than or equal to the third number of slots. The repetition level of the second portion 420 may different than the repetition level of the third portion 425.

In some implementations, the second repetition level associated with the third portion 425 may be greater than the first repetition level associated with the second portion 420 (e.g., may feature a greater number of repetitions or a greater repetition density). For example, the base station 105 may implement the window configuration 405 based on transmitting control information at a progressively greater repetition level. As such, a first set of UEs 115 of the number of UEs 115 may be associated with good link conditions (e.g., may be in a higher connectivity state) and may successfully receive and decode a single instance of a control information transmission during the first portion 415. In some examples, a second set of UEs 115 may be associated with relatively worse link conditions (e.g., may be in a lower connectivity state) and may have been unable to successfully receive and decode the single instance of the control information transmission during the first portion 415.

In such examples, the first set of UEs 115 may terminate their monitoring occasions and the base station 105 may advance the random access procedure for the first set of UEs 115 while the second set of UEs 115 may identify that their random access procedure is operating within the second portion 420 (e.g., the second set of UEs 115 may still be attempting to receive and decode the control information). During the second portion 420, the second set of UEs 115 may combine multiple control information instances according to the window configuration 405 and the repetition level of the second portion 420 (e.g., which may increase the likelihood of successfully receiving and decoding the control information during the RAR window). In some cases, a third set (e.g., a subset of the second set that may be in a lower connectivity state) of the UEs 115 may still be unable to receive and decode the control information. Accordingly, the third set of UEs 115 may continue to the third portion 425, which may be associated with a greater repetition level than the second portion 420, further increasing the likelihood of successfully receiving and decoding the control information.

This process may continue based on the number of portions configured in the window configuration 405 or the number of UEs 115 that may perform the random access procedure and their connectivity condition. In this manner, each UE 115 may monitor a number of slots associated with the portion of the window.

The window configuration 405-a of FIG. 4A may be an example of an RAR window configuration that supports the techniques of the present disclosure. The window configuration 405-a may be associated with a window length 410-a. In some cases, window length 410-a may be associated with an initial (e.g., a default) window length of an RAR window that was indicated by the system information from the base station 105. Accordingly, the window configuration 405-a illustrates an example RAR window configuration that includes partitioning an initial window length 410-a into two or more portions, where at least one portion of the RAR window may be configured for repeatedly transmitting the control information in consecutive slots during the length indicated by the system information.

The window configuration 405-b of FIG. 4B may be another example of an RAR window configuration that supports the techniques of the present disclosure. The window configuration 405-b may be associated with a window length 410-b plus an appended window length 430 (e.g., an appended window segment). Accordingly, the window configuration 405-b illustrates an example RAR window configuration that includes appending to an initial (e.g., a default) window length 410-b such that a portion of the RAR window may be configured for repeatedly transmitting the control information in consecutive slots after a length of the RAR window indicated by a system information has expired. In some examples, the base station 105, using a second indicator included in the system information, may indicate window length 430.

The window configuration 405-c of FIG. 4C may be another example of an RAR window configuration that supports the techniques of the present disclosure. The window configuration 405-c may be a hybrid of the window configuration 405-a and the window configuration 405-b, such that the window configuration 405-c may both partition and append to the window length 410-c indicated by the system information. For example, the base station 105, using a second indicator of the system information, may indicate a window length 435 and may additionally indicate an overlap between the window length 410-c and the window length 435.

Figure 5:
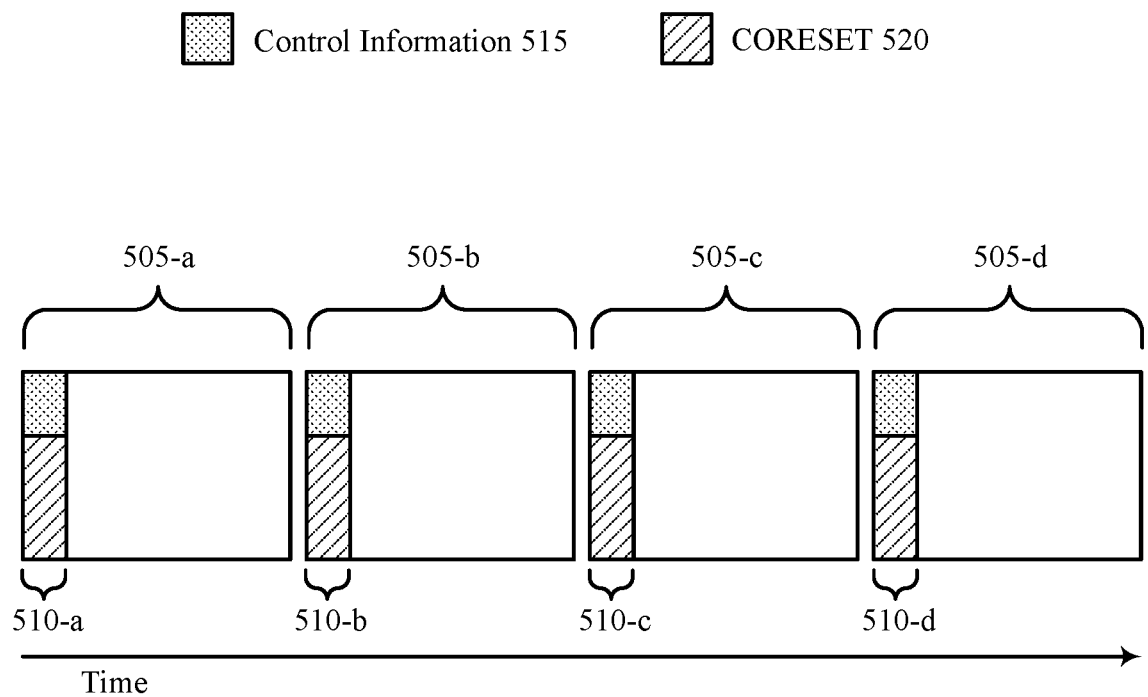
FIG. 5 illustrates an example of a repetition schedule that supports message repetition for a random access procedure in accordance with aspects of the present disclosure.

FIG. 5 illustrates an example of a repetition schedule 500 that supports message repetition for a random access procedure in accordance with aspects of the present disclosure. In some examples, the repetition schedule 500 may illustrate how a base station 105 may transmit a number of instances of the control information associated with an RAR in a number of consecutive slots. Based on using the repetition schedule 500, a UE 115 may be more likely to connect to the base station 105 using a random access procedure during a low connectivity condition.

The repetition schedule 500 may include a number of slots, such as a slot 505-a, a slot 505-b, a slot 505-c, and a slot 505-d. A CORESET 520 may be located inside each slot 505, and an instance of control information 515 may be included inside each CORESET 520. In some examples, each instance of the control information 515 may be in the same location in each of the number of slots 505. For example, the base station 105 may transmit all instances of the control information 515 associated with the same RAR such that the UE 115 may receive the control information 515 at monitoring occasions 510-a, 510-b, 510-c, and 510-d (e.g., at the same location in each consecutive slot). Additionally or alternatively, each instance of the control information 515 may be associated with the same repetition level, and the UE 115 may identify the repetition level of each instance of the control information 515 to identify or determine which instances of control information 515 may be linked (e.g., combined). In some aspects, each instance of the control information 515 may include the same number of CCEs. Additionally or alternatively, each instance of the control information 515 may be associated with an index that the UE 115 may use to link (e.g., combine) a number of instances of the control information 515. In some cases, one or more instances of the control information 515 may be in different locations in each of the number of slots 505.

Figure 6:
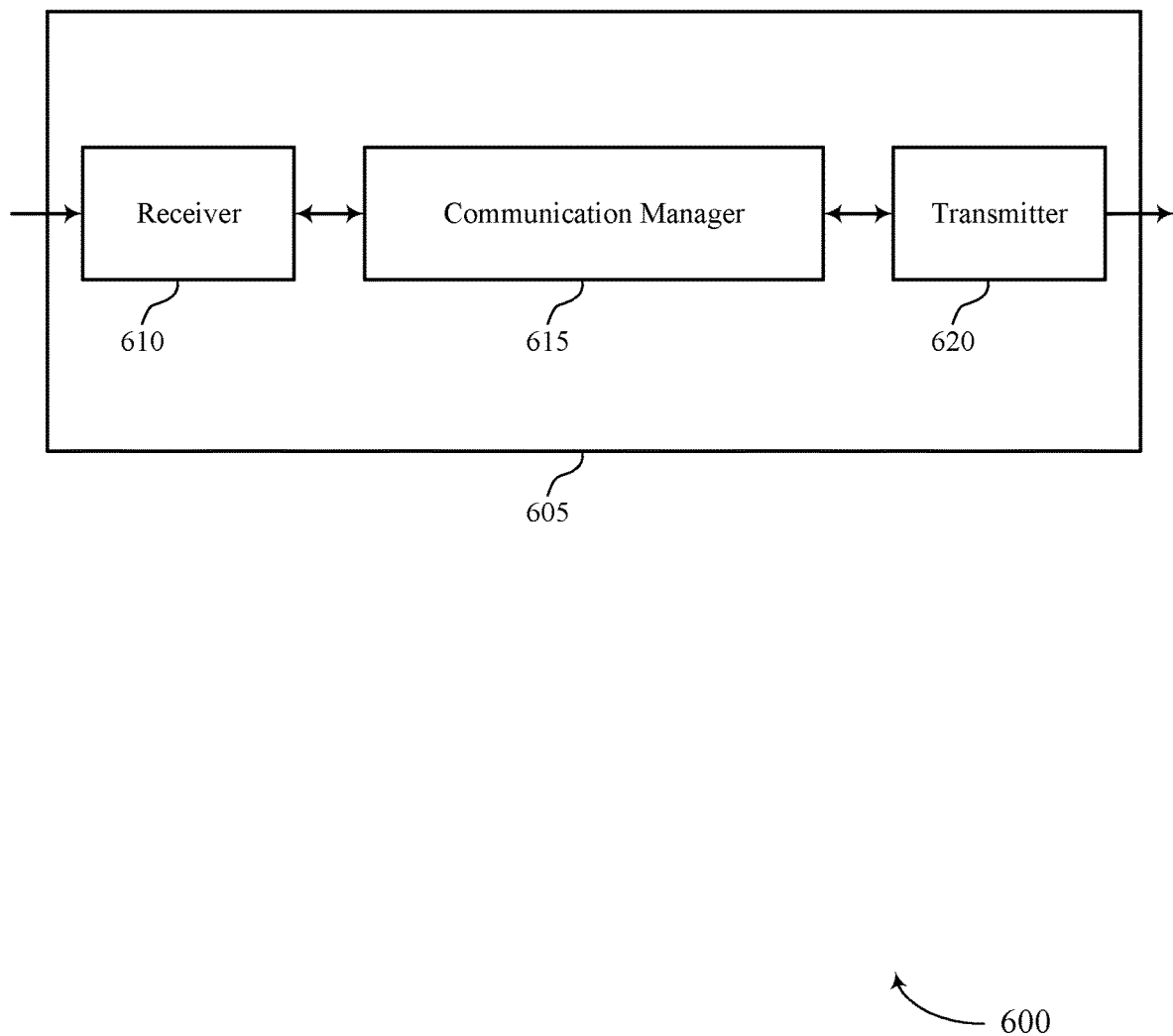
FIGS. 6 and 7 show block diagrams of devices that support message repetition for a random access procedure in accordance with aspects of the present disclosure.

FIG. 6 shows a block diagram 600 of a device 605 that supports message repetition for a random access procedure in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to message repetition for a random access procedure, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may identify that a random access procedure is operating within a portion of a window for communicating a random access response where the portion of the window is configured for repeatedly providing control information associated with the random access response in multiple slots, monitor, during the portion of the window, a set of slots for instances of the control information based on identifying that the random access procedure is operating within the portion of the window configured for repeatedly providing the control information in multiple slots, combine the instances identified from monitoring the set of slots, and decode the random access response received as part of the random access procedure based on combining the instances. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

In some examples, the communication manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communication manager 615 as described herein may be implemented to realize one or more potential advantages. One implementation may enable the device 605 to connect to a base station 105 while operating in a low connectivity condition with minimal signaling and low overhead, resulting in increased processing efficiency. Further, another implementation may allow the device 605 to increase the likelihood of successfully decoding the control information associated with an RAR, reducing the chance that the device 605 may repeat the random access procedure. This may save processing time, reduce latency, improve power savings, and increase battery life at the device 605.

Based on techniques for efficiently communicating an RAR window configuration that enables the device 605 to perform soft-combining during an RAR window of a random access procedure, a processor of the device 605 (e.g., controlling the receiver 610, the transmitter 620 or a transceiver 915 as described with reference to FIG. 9) may increase system efficiency and decrease unnecessary processing at a device.

Figure 7:
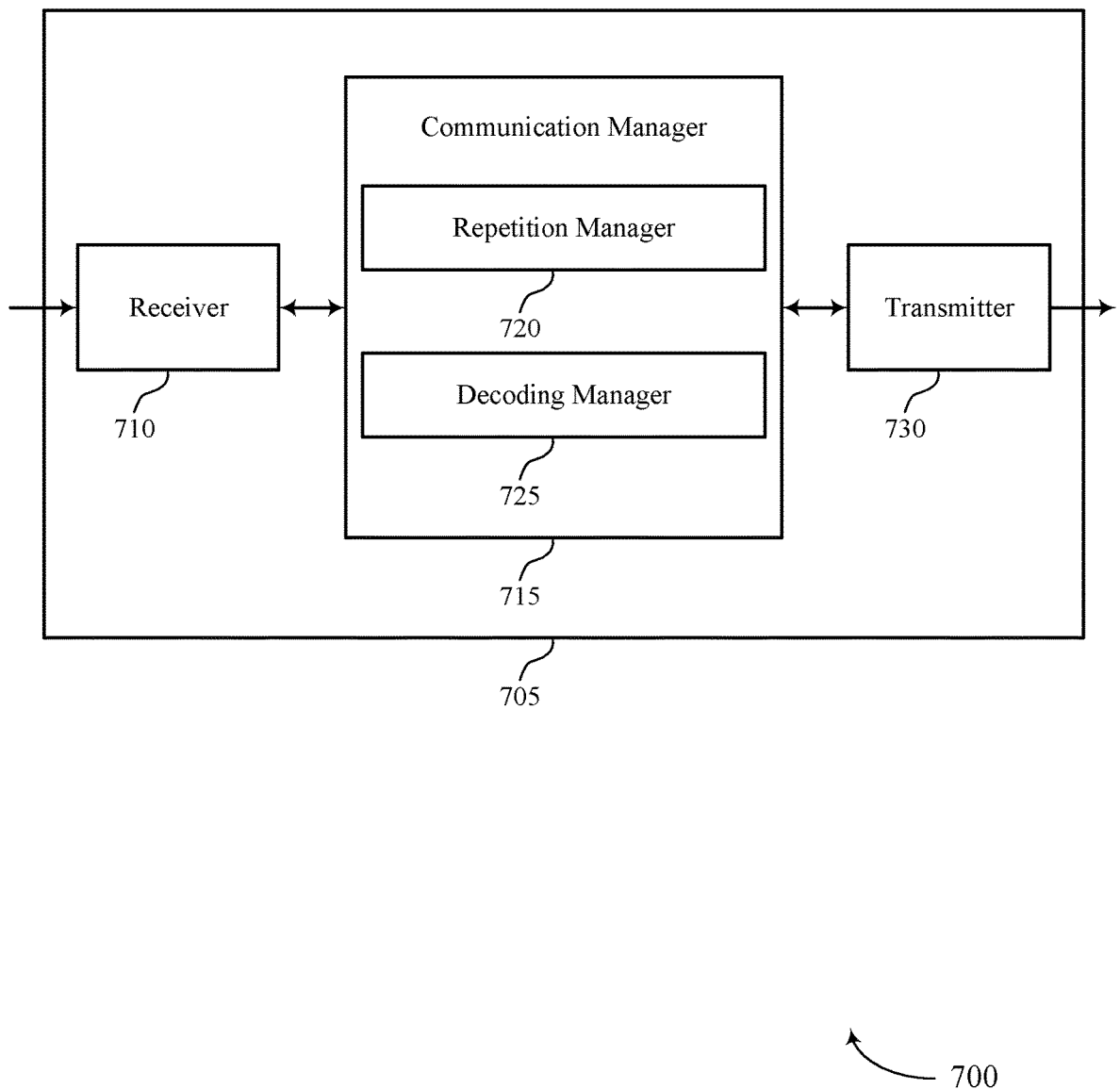

FIG. 7 shows a block diagram 700 of a device 705 that supports message repetition for a random access procedure in accordance with aspects of the present disclosure. The device 705 may be an example of aspects of a device 605, or a UE 115 as described herein. The device 705 may include a receiver 710, a communication manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to message repetition for a random access procedure, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a repetition manager 720 and a decoding manager 725. The communication manager 715 may be an example of aspects of the communication manager 910 described herein.

The repetition manager 720 may identify that a random access procedure is operating within a portion of a window for communicating a random access response where the portion of the window is configured for repeatedly providing control information associated with the random access response in multiple slots, monitor, during the portion of the window, a set of slots for instances of the control information based on identifying that the random access procedure is operating within the portion of the window configured for repeatedly providing the control information in multiple slots, and combine the instances identified from monitoring the set of slots.

The decoding manager 725 may decode the random access response received as part of the random access procedure based on combining the instances. The transmitter 730 may transmit signals generated by other components of the device 705. In some examples, the transmitter 730 may be collocated with a receiver 710 in a transceiver module. For example, the transmitter 730 may be an example of aspects of the transceiver 915 described with reference to FIG. 9. The transmitter 730 may utilize a single antenna or a set of antennas.

Figure 8:
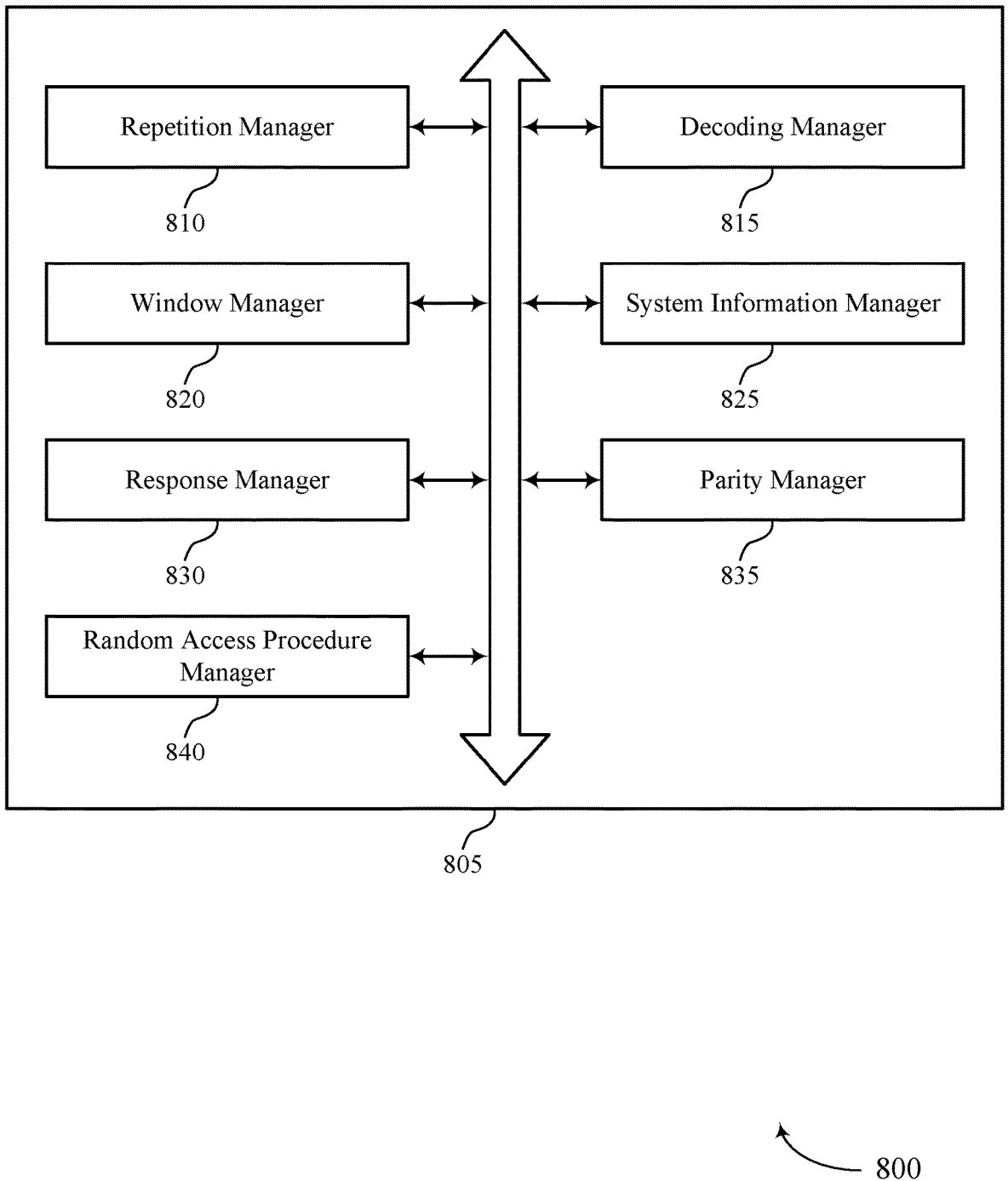
FIG. 8 shows a block diagram of a communication manager that supports message repetition for a random access procedure in accordance with aspects of the present disclosure.

FIG. 8 shows a block diagram 800 of a communication manager 805 that supports message repetition for a random access procedure in accordance with aspects of the present disclosure. The communication manager 805 may be an example of aspects of a communication manager 615, a communication manager 715, or a communication manager 910 described herein. The communication manager 805 may include a repetition manager 810, a decoding manager 815, a window manager 820, a system information manager 825, a response manager 830, a parity manager 835, and a random access procedure manager 840. Each of these modules may communicate, directly or indirectly, with one another (e.g., via one or more buses).

The repetition manager 810 may identify that a random access procedure is operating within a portion of a window for communicating a random access response where the portion of the window is configured for repeatedly providing control information associated with the random access response in multiple slots. In some examples, the repetition manager 810 may monitor, during the portion of the window, a set of slots for instances of the control information based on identifying that the random access procedure is operating within the portion of the window configured for repeatedly providing the control information in multiple slots. In some examples, the repetition manager 810 may combine the instances identified from monitoring the set of slots. In some examples, the repetition manager 810 may identify that the random access procedure is operating within a second portion of the window that is configured for transmitting a single instance of the control information of the random access response.

In some examples, the repetition manager 810 may monitor, during the second portion of the window, a second set of slots for the single instance of the control information based on identifying that the random access procedure is operating within the second portion of the window, where identifying that the random access procedure is operating within the portion of the window is based on monitoring the second set of slots for the single instance of the control information. In some examples, the repetition manager 810 may identify a repetition level associated with the instances for combining or an index associated with the instances for combining, where combining the instances is based on identifying the repetition level or the index of the instances for combining. In some cases, a repetition level associated with the portion of the window includes a numerical quantity of multiple slots for repeating the control information.

The decoding manager 815 may decode the random access response received as part of the random access procedure based on combining the instances.

The window manager 820 may identify that the portion of the window configured for repeatedly providing the control information in multiple slots occurs after a length of the window indicated by a system information has expired, where monitoring the set of slots is based on the identifying. In some examples, the window manager 820 may identify that the portion of the window configured for repeatedly providing the control information in multiple slots occurs during at least a second portion of a length of the window indicated by system information, where monitoring the set of slots is based on the identifying. In some cases, a first portion for transmitting a single instance of the control information. In some cases, a second portion for transmitting repeating instances of the control information in multiple slots according to a first repetition level. In some cases, a third portion for transmitting repeating instances of the control information in multiple slots according to a second repetition level different than the first repetition level.

The system information manager 825 may receive system information that includes an indicator of a configuration of the window, where identifying that that the random access procedure is operating within the portion of the window is based on receiving the system information that includes the indicator. In some examples, the system information manager 825 may identify an index value of the configuration included in the system information.

In some examples, the system information manager 825 may retrieve information about the configuration of the window based on identifying the index value, where identifying that the random access procedure is operating within the portion of the window is based on retrieving the information. In some examples, the system information manager 825 may identify information about a repetition level associated with each portion of the window for communicating random access responses included in the system information, where identifying that the random access procedure is operating within the portion of the window is based on identifying the information.

In some examples, the system information manager 825 may identify the configuration of the window for communicating the random access response as part of the random access procedure based on receiving the system information that includes the indicator, where identifying that that the random access procedure is operating within the portion of the window is based on identifying the configuration. In some cases, the indicator of the system information for indicating the configuration of the window includes one or more bits. In some cases, the system information includes a system information block or a master information block.

The response manager 830 may identify a location of the random access response in a data channel based on combining the instances of the control information, where decoding the random access response is based on identifying the location of the random access response in the data channel. In some cases, the random access response includes a message2 of the random access procedure.

The parity manager 835 may perform a parity check on the control information generated from combining the instances, where decoding the random access response is based on performing the parity check.

The random access procedure manager 840 may initiate the random access procedure. In some examples, the random access procedure manager 840 may transmit, to a base station, a random access request, where monitoring the set of slots is based on transmitting the random access request. In some examples, the random access procedure manager 840 may transmit, to a base station, a radio resource control connection request based on decoding the random access response.

Figure 9:
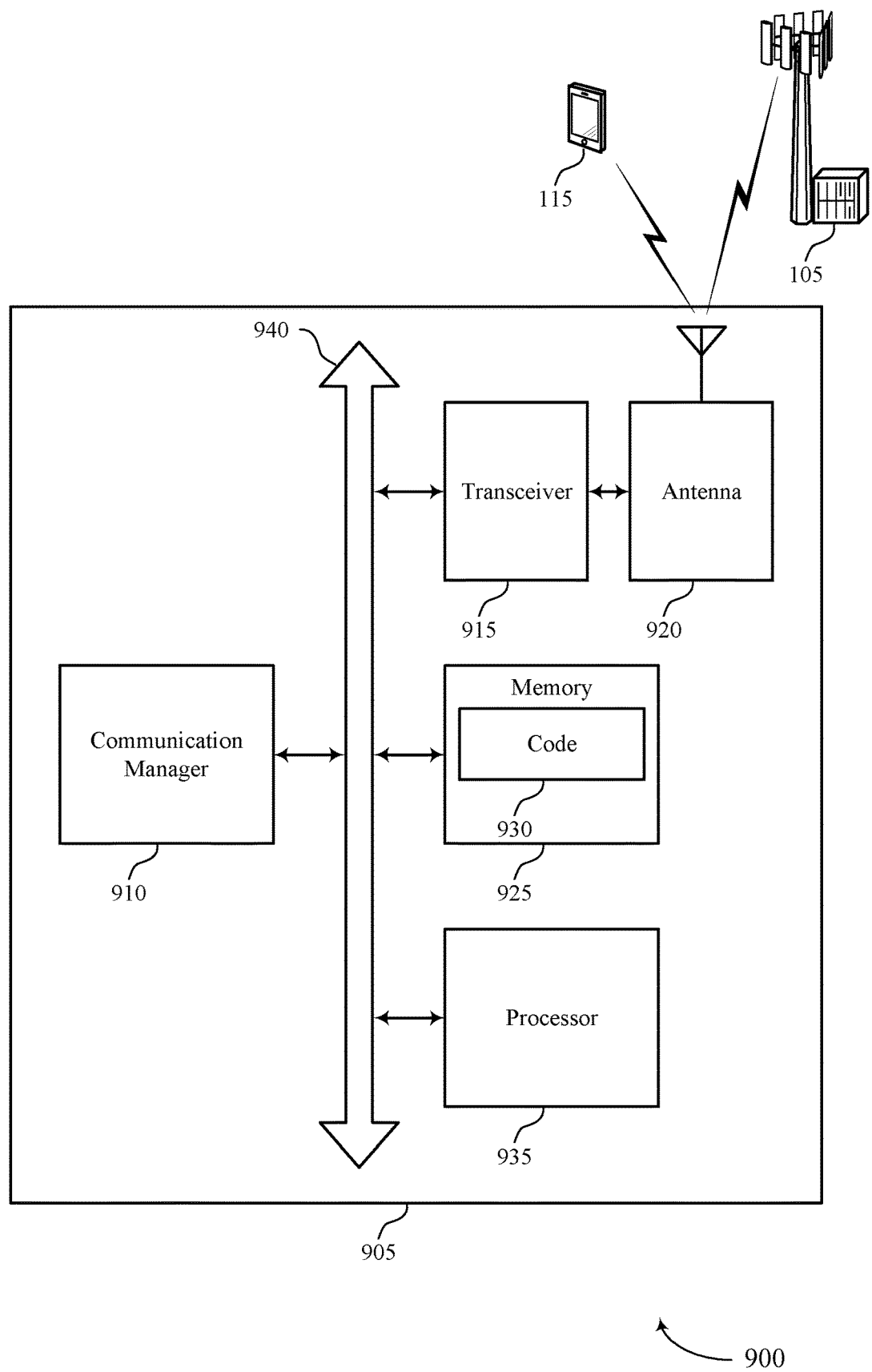
FIG. 9 shows a diagram of a system including a device that supports message repetition for a random access procedure in accordance with aspects of the present disclosure.

FIG. 9 shows a diagram of a system 900 including a device 905 that supports message repetition for a random access procedure in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may identify that a random access procedure is operating within a portion of a window for communicating a random access response where the portion of the window is configured for repeatedly providing control information associated with the random access response in multiple slots, monitor, during the portion of the window, a set of slots for instances of the control information based on identifying that the random access procedure is operating within the portion of the window configured for repeatedly providing the control information in multiple slots, combine the instances identified from monitoring the set of slots, and decode the random access response received as part of the random access procedure based on combining the instances.

The transceiver 915 may communicate bi-directionally, via one or more antennas, wired, or wireless links as described herein. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting message repetition for a random access procedure).

Figure 10:
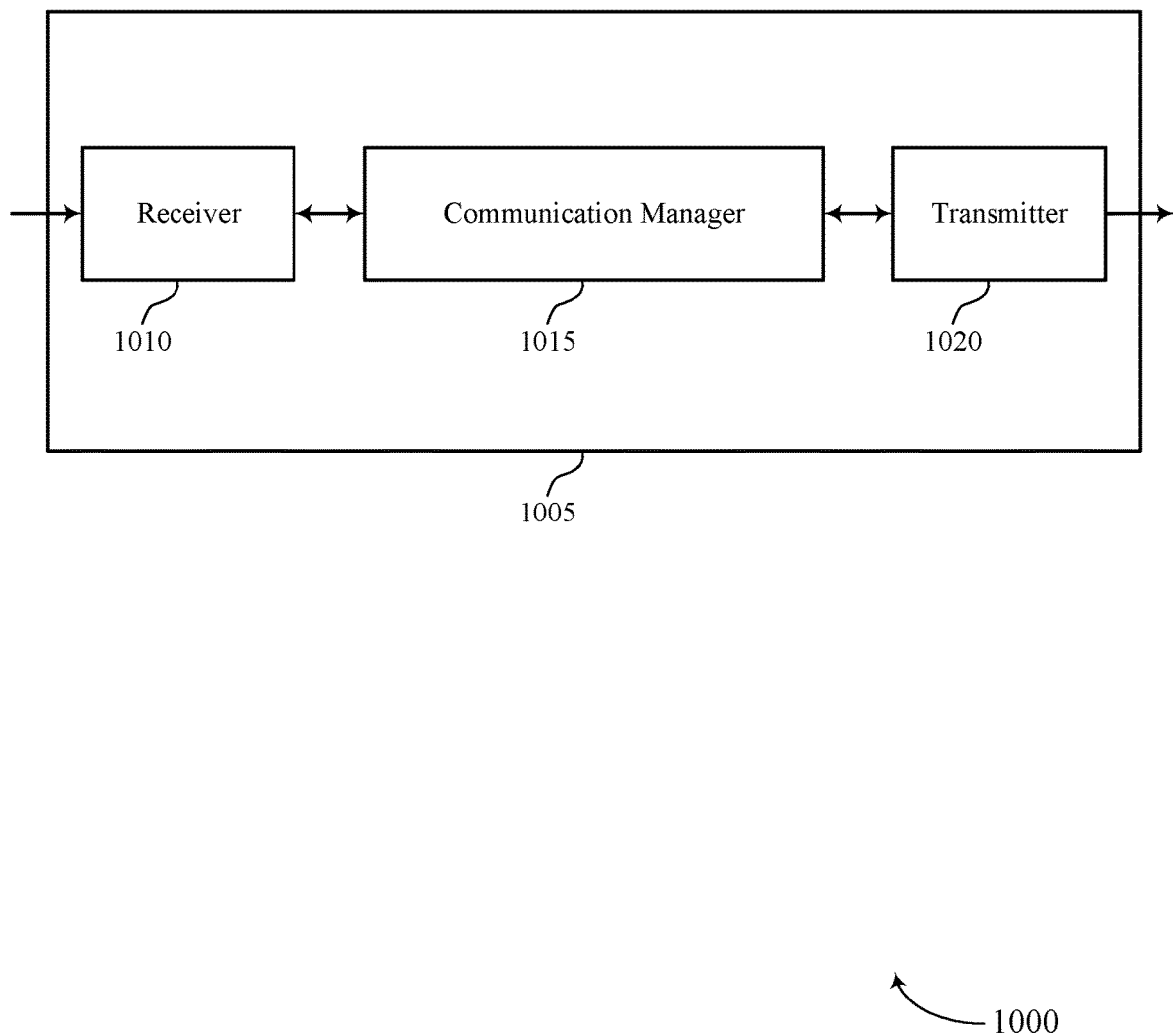
FIGS. 10 and 11 show block diagrams of devices that support message repetition for a random access procedure in accordance with aspects of the present disclosure.

FIG. 10 shows a block diagram 1000 of a device 1005 that supports message repetition for a random access procedure in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to message repetition for a random access procedure, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may identify that a random access procedure is operating within a first portion of a window for communicating a random access response where the first portion of the window is configured for transmitting a single instance of control information of the random access response and identify that the random access procedure is operating within a second portion of the window that is configured for transmitting repeating instances of the control information of the random access response in multiple slots. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

The communication manager 1015 may be implemented to realize one or more potential advantages. In one implementation, the communication manager 1015 may configure an RAR window to provide for progressively greater repetition levels of control information associated with an RAR throughout multiple portions of the RAR window. As such, connecting devices, such as UEs 115, associated with relatively better link conditions may advance through a random access procedure after a first portion of the RAR window configured for providing single instances of the control information while other connecting devices associated with relatively worse link conditions may advance through the random access procedure after a second portion of the RAR window configured for providing repeating instances of the control information. Accordingly, the devices associated with the relatively better link conditions may avoid storing one or more instances of the control information and also avoid added latency (as such devices advance through the random access procedure prior to the second portion of the RAR window) while the devices associated with the relatively worse link conditions will still advance through the random access procedure (without restarting the random access procedure) based on implementing soft-combining techniques during the second portion of the RAR window. Likewise, the communication manager 1015 may potentially participate in fewer random access procedures, which may reduce signaling overhead and improve power savings at the device 1005.

Figure 11:
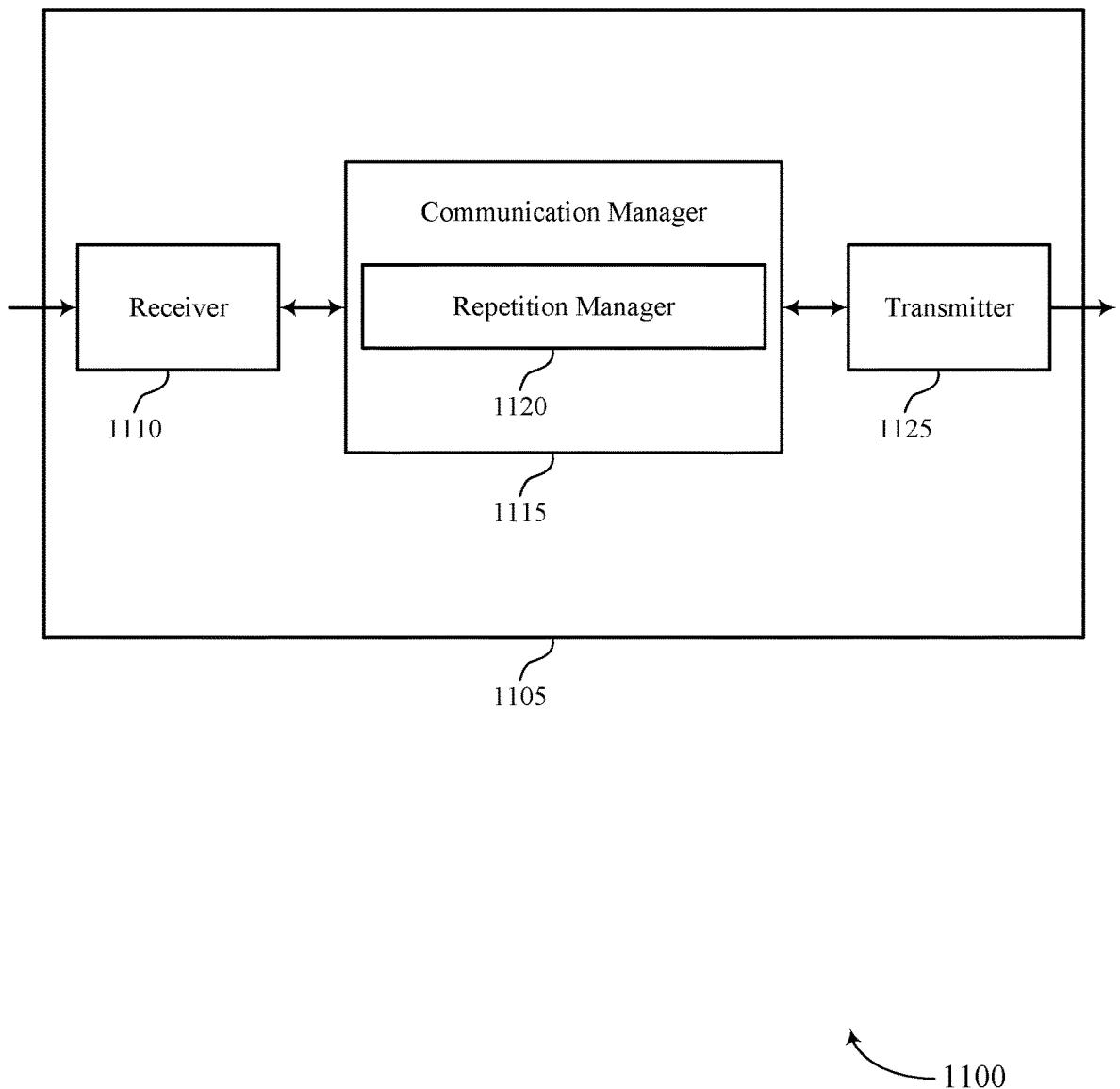

FIG. 11 shows a block diagram 1100 of a device 1105 that supports message repetition for a random access procedure in accordance with aspects of the present disclosure. The device 1105 may be an example of aspects of a device 1005, or a base station 105 as described herein. The device 1105 may include a receiver 1110, a communication manager 1115, and a transmitter 1125. The device 1105 may also include a processor. Each of these components may be in communication with one another (e.g., via one or more buses).

The receiver 1110 may receive information such as packets, user data, or control information associated with various information channels (e.g., control channels, data channels, and information related to message repetition for a random access procedure, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a repetition manager 1120. The communication manager 1115 may be an example of aspects of the communication manager 1310 described herein.

The repetition manager 1120 may identify that a random access procedure is operating within a first portion of a window for communicating a random access response where the first portion of the window is configured for transmitting a single instance of control information of the random access response and identify that the random access procedure is operating within a second portion of the window that is configured for transmitting repeating instances of the control information of the random access response in multiple slots.

The transmitter 1125 may transmit signals generated by other components of the device 1105. In some examples, the transmitter 1125 may be collocated with a receiver 1110 in a transceiver module. For example, the transmitter 1125 may be an example of aspects of the transceiver 1320 described with reference to FIG. 13. The transmitter 1125 may utilize a single antenna or a set of antennas.

Figure 12:
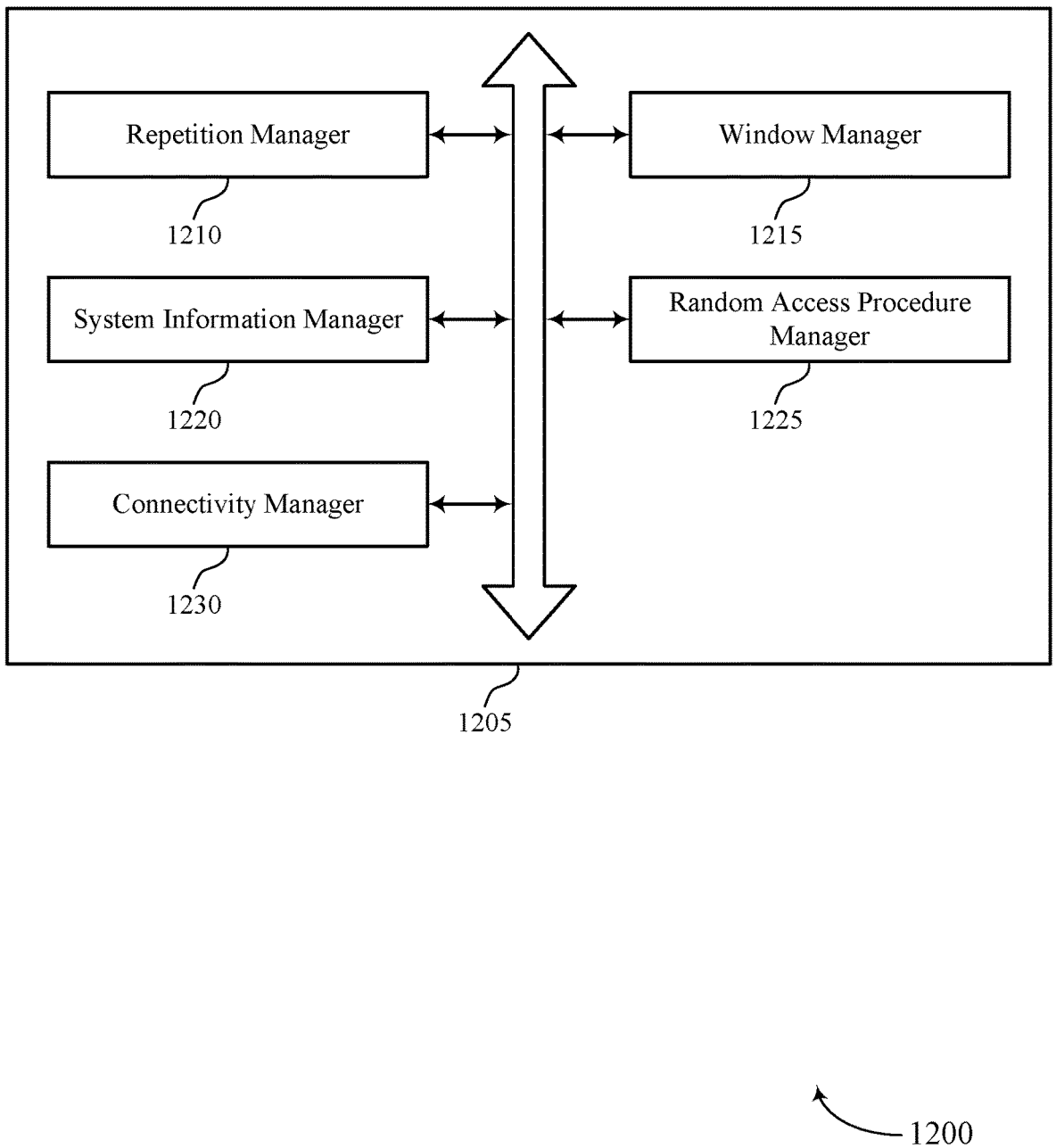
FIG. 12 shows a block diagram of a communication manager that supports message repetition for a random access procedure in accordance with aspects of the present disclosure.

FIG. 12 shows a block diagram 1200 of a communication manager 1205 that supports message repetition for a random access procedure in accordance with aspects of the present disclosure. The communication manager 1205 may be an example of aspects of a communication manager 1015, a communication manager 1115, or a communication manager 1310 described herein. The communication manager 1205 may include a repetition manager 1210, a window manager 1215, a system information manager 1220, a random access procedure manager 1225, and a connectivity manager 1230. Each of these modules may communicate, directly or indirectly, with one another (e.g., via one or more buses).

The repetition manager 1210 may identify that a random access procedure is operating within a first portion of a window for communicating a random access response where the first portion of the window is configured for transmitting a single instance of control information of the random access response. In some examples, the repetition manager 1210 may identify that the random access procedure is operating within a second portion of the window that is configured for transmitting repeating instances of the control information of the random access response in multiple slots. In some examples, identifying information about a repetition level for repeating transmissions of the control information associated with each portion of the window, where an indicator of a configuration of the window included in system information includes the information. In some cases, a repetition level associated with the second portion of the window includes a numerical quantity of multiple slots for repeating the transmission of the control information. In some cases, the random access response includes a message2 of the random access procedure. In some cases, the multiple slots may be consecutive slots and the second slot may be a consecutive slot after the first slot.

The window manager 1215 may identify that the second portion of the window configured for repeatedly providing the control information in multiple slots occurs after a length of the window indicated by system information has expired based on a configuration of the window, where transmitting the control information in the first slot and the second slot is based on the identifying. In some examples, the window manager 1215 may identify that the second portion of the window configured for repeatedly providing the control information in multiple slots occurs during at least a third portion of a length of the window indicated by system information based on a configuration of the window, where transmitting the control information in the first slot and the second slot is based on the identifying.

In some examples, the window manager 1215 may identify a configuration of the window for communicating the random access response as part of the random access procedure, the configuration of the window including at least one portion for repeatedly providing the control information of the random access response in multiple slots, where identifying that the random access procedure is operating within the first portion of the window is based on identifying the configuration. In some cases, the first portion of the window is for transmitting the single instance of the control information. In some cases, the second portion of the window is for transmitting repeating instances of the control information in multiple slots according to a first repetition level. In some cases, a third portion for transmitting repeating instances of the control information in multiple slots according to a second repetition level different than the first repetition level.

The system information manager 1220 may transmit system information that includes an indicator of a configuration of the window for communicating the control information of the random access response, where identifying that the random access procedure is operating within the first portion of the window is based on transmitting the system information. In some examples, identifying an index value of the configuration, where the indicator of the configuration of the window included in the system information includes the index value. In some cases, the indicator of the system information for indicating the configuration of the window includes one or more bits. In some cases, the system information includes a system information block or a master information block.

The random access procedure manager 1225 may identify that a timer associated with the first portion of the window has expired and that a message has not been received from a user equipment before the timer has expired, where identifying that the random access procedure is operating within the second portion is based on the identifying. In some examples, the random access procedure manager 1225 may receive a radio resource control connection request based on transmitting the control information in the first slot and in the second slot after the first slot during the second portion of the window.

In some examples, the random access procedure manager 1225 may advance the random access procedure based on receiving the radio resource control connection request. In some examples, the random access procedure manager 1225 may receive, from a user equipment, a random access request, where transmitting the control information is based on receiving the random access request. In some cases, the message includes a message3 of the random access procedure.

The connectivity manager 1230 may identify that the base station is operating in a connectivity condition that satisfies a signal quality threshold, where identifying that the random access procedure is operating within the first portion of the window is based on identifying that the base station is operating in the connectivity condition that satisfies the signal quality threshold.

Figure 13:
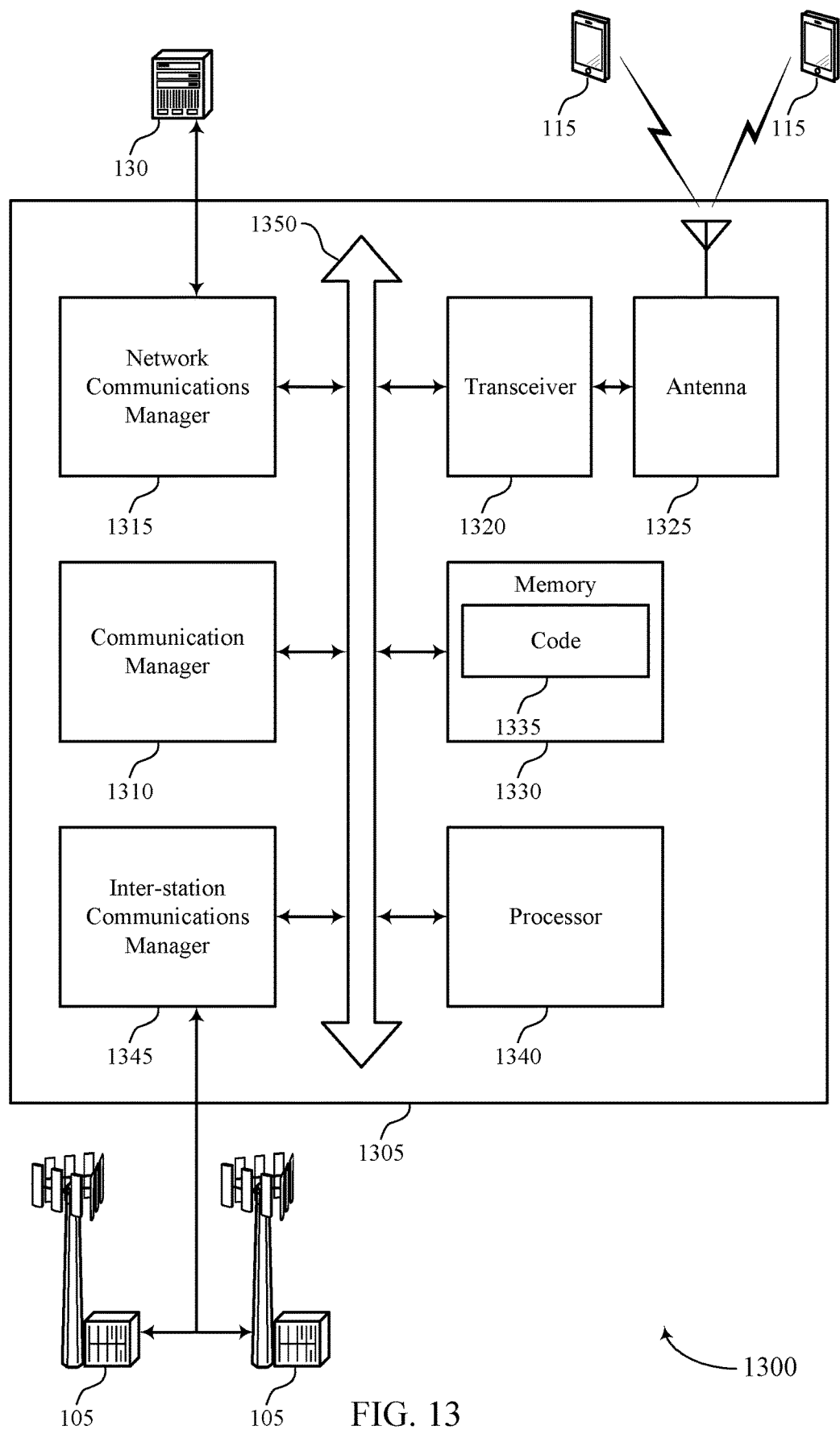
FIG. 13 shows a diagram of a system including a device that supports message repetition for a random access procedure in accordance with aspects of the present disclosure.

FIG. 13 shows a diagram of a system 1300 including a device 1305 that supports message repetition for a random access procedure in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may identify that a random access procedure is operating within a first portion of a window for communicating a random access response where the first portion of the window is configured for transmitting a single instance of control information of the random access response and identify that the random access procedure is operating within a second portion of the window that is configured for transmitting repeating instances of the control information of the random access response in multiple slots.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting message repetition for a random access procedure).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
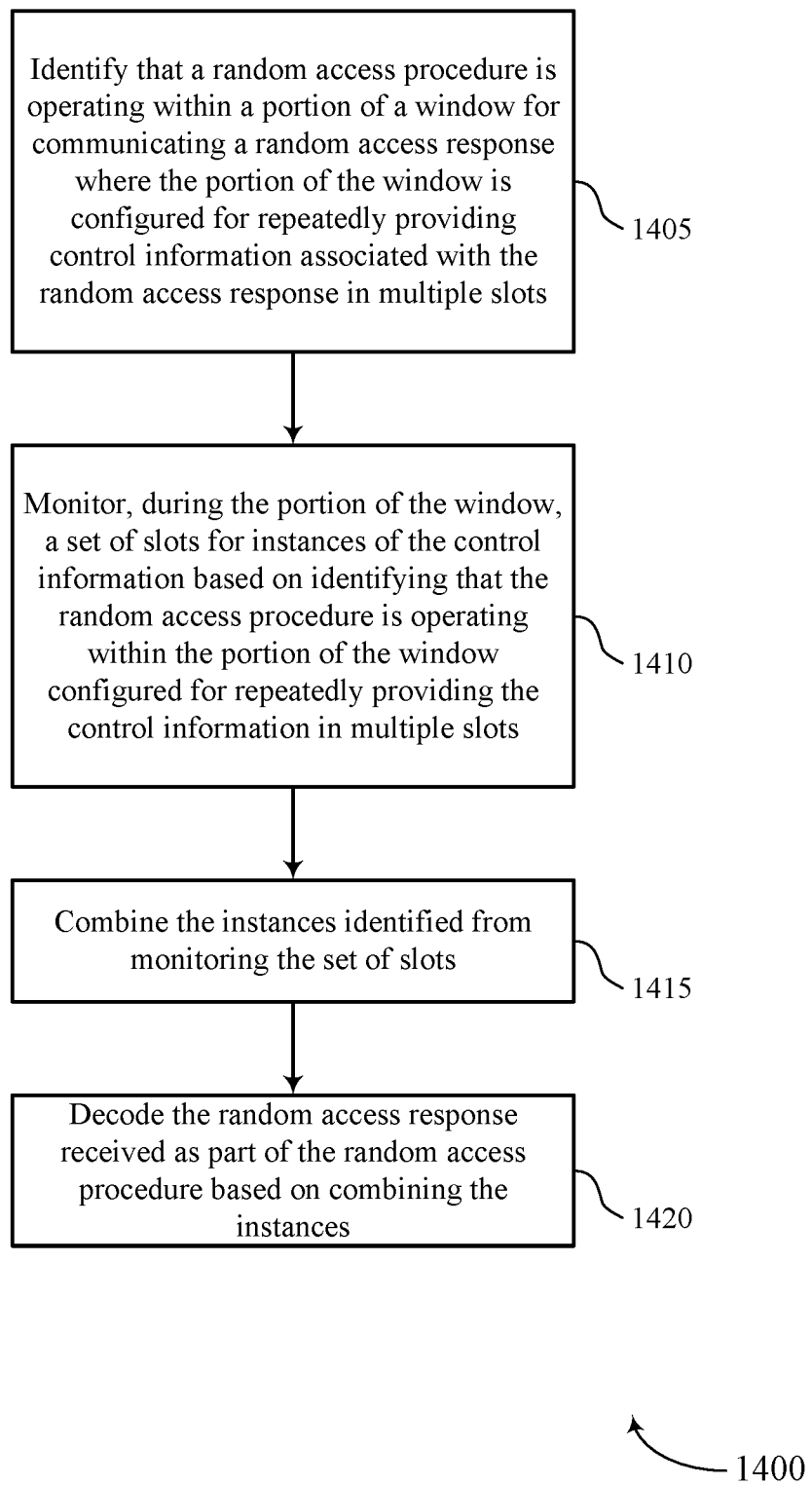
FIGS. 14 through 17 show flowcharts illustrating methods that support message repetition for a random access procedure in accordance with aspects of the present disclosure.

FIG. 14 shows a flowchart illustrating a method 1400 that supports message repetition for a random access procedure in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may identify that a random access procedure is operating within a portion of a window for communicating an RAR where the portion of the window is configured for repeatedly providing control information associated with the RAR in multiple slots. The operations of 1405 may be performed according to the methods described herein. In some examples, aspects of the operations of 1405 may be performed by a repetition manager as described with reference to FIGS. 6 through 9.

At 1410, the UE may monitor, during the portion of the window, a set of slots for instances of the control information based on identifying that the random access procedure is operating within the portion of the window configured for repeatedly providing the control information in multiple slots. The operations of 1410 may be performed according to the methods described herein. In some examples, aspects of the operations of 1410 may be performed by a repetition manager as described with reference to FIGS. 6 through 9.

At 1415, the UE may combine the instances identified from monitoring the set of slots. The operations of 1415 may be performed according to the methods described herein. In some examples, aspects of the operations of 1415 may be performed by a repetition manager as described with reference to FIGS. 6 through 9.

At 1420, the UE may decode the RAR received as part of the random access procedure based on combining the instances. The operations of 1420 may be performed according to the methods described herein. In some examples, aspects of the operations of 1420 may be performed by a decoding manager as described with reference to FIGS. 6 through 9.

Figure 15:
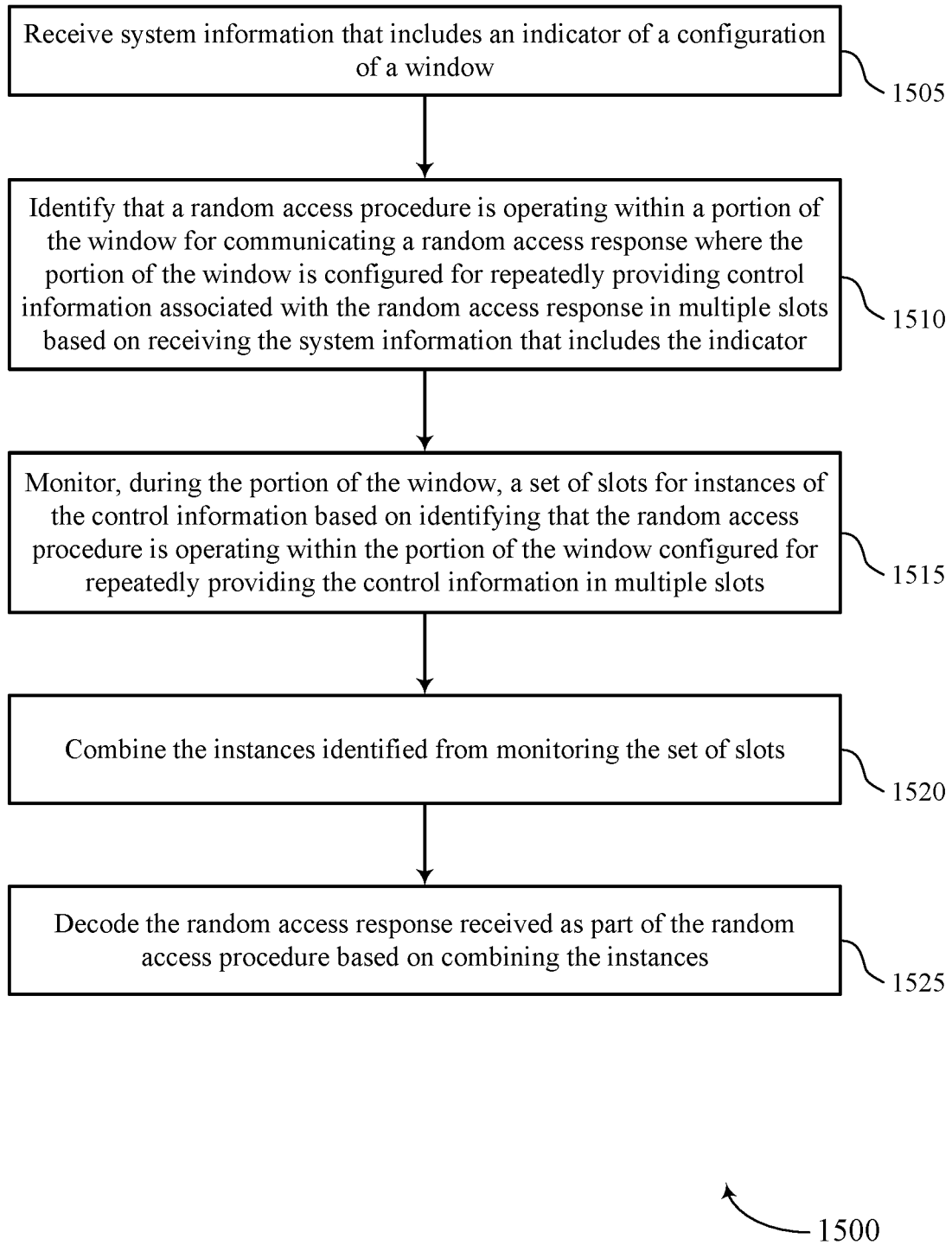

FIG. 15 shows a flowchart illustrating a method 1500 that supports message repetition for a random access procedure in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may receive system information that includes an indicator of a configuration of a window. The operations of 1505 may be performed according to the methods described herein. In some examples, aspects of the operations of 1505 may be performed by a system information manager as described with reference to FIGS. 6 through 9.

At 1510, the UE may identify that a random access procedure is operating within a portion of the window for communicating an RAR where the portion of the window is configured for repeatedly providing control information associated with the RAR in multiple slots based on receiving the system information that includes the indicator. The operations of 1510 may be performed according to the methods described herein. In some examples, aspects of the operations of 1510 may be performed by a repetition manager as described with reference to FIGS. 6 through 9.

At 1515, the UE may monitor, during the portion of the window, a set of slots for instances of the control information based on identifying that the random access procedure is operating within the portion of the window configured for repeatedly providing the control information in multiple slots. The operations of 1515 may be performed according to the methods described herein. In some examples, aspects of the operations of 1515 may be performed by a repetition manager as described with reference to FIGS. 6 through 9.

At 1520, the UE may combine the instances identified from monitoring the set of slots. The operations of 1520 may be performed according to the methods described herein. In some examples, aspects of the operations of 1520 may be performed by a repetition manager as described with reference to FIGS. 6 through 9.

At 1525, the UE may decode the RAR received as part of the random access procedure based on combining the instances. The operations of 1525 may be performed according to the methods described herein. In some examples, aspects of the operations of 1525 may be performed by a decoding manager as described with reference to FIGS. 6 through 9.

Figure 16:
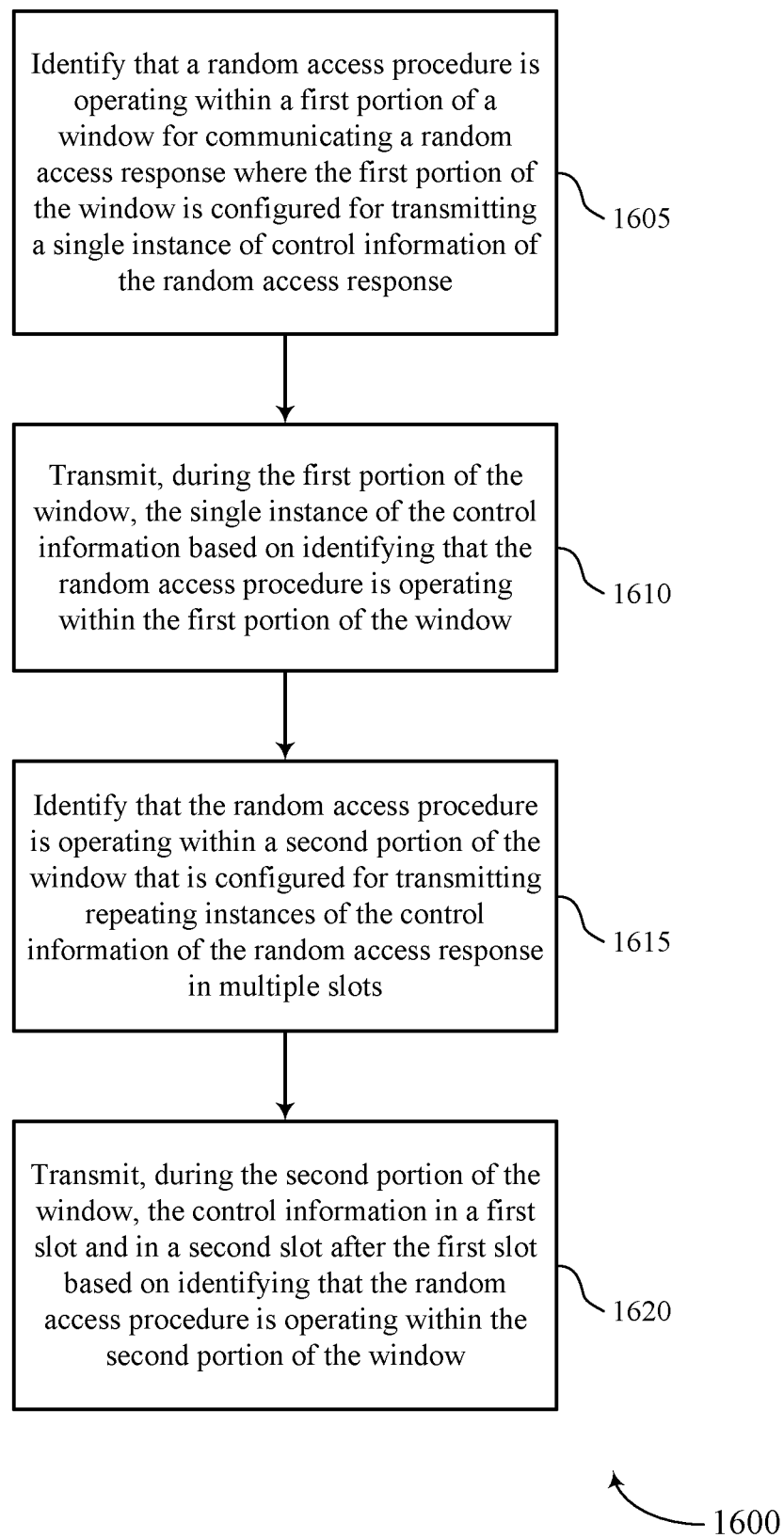

FIG. 16 shows a flowchart illustrating a method 1600 that supports message repetition for a random access procedure in accordance with aspects of the present disclosure. The operations of method 1600 may be implemented by a base station 105 or its components as described herein. For example, the operations of method 1600 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1605, the base station may identify that a random access procedure is operating within a first portion of a window for communicating an RAR where the first portion of the window is configured for transmitting a single instance of control information of the RAR. The operations of 1605 may be performed according to the methods described herein. In some examples, aspects of the operations of 1605 may be performed by a repetition manager as described with reference to FIGS. 10 through 13.

At 1610, the base station may transmit, during the first portion of the window, the single instance of the control information based on identifying that the random access procedure is operating within the first portion of the window. The operations of 1610 may be performed according to the methods described herein. In some examples, aspects of the operations of 1610 may be performed by a message manager as described with reference to FIGS. 10 through 13.

At 1615, the base station may identify that the random access procedure is operating within a second portion of the window that is configured for transmitting repeating instances of the control information of the RAR in multiple slots. The operations of 1615 may be performed according to the methods described herein. In some examples, aspects of the operations of 1615 may be performed by a repetition manager as described with reference to FIGS. 10 through 13.

At 1620, the base station may transmit, during the second portion of the window, the control information in a first slot and in a second slot after the first slot based on identifying that the random access procedure is operating within the second portion of the window. The operations of 1620 may be performed according to the methods described herein. In some examples, aspects of the operations of 1620 may be performed by a message manager as described with reference to FIGS. 10 through 13.

Figure 17:
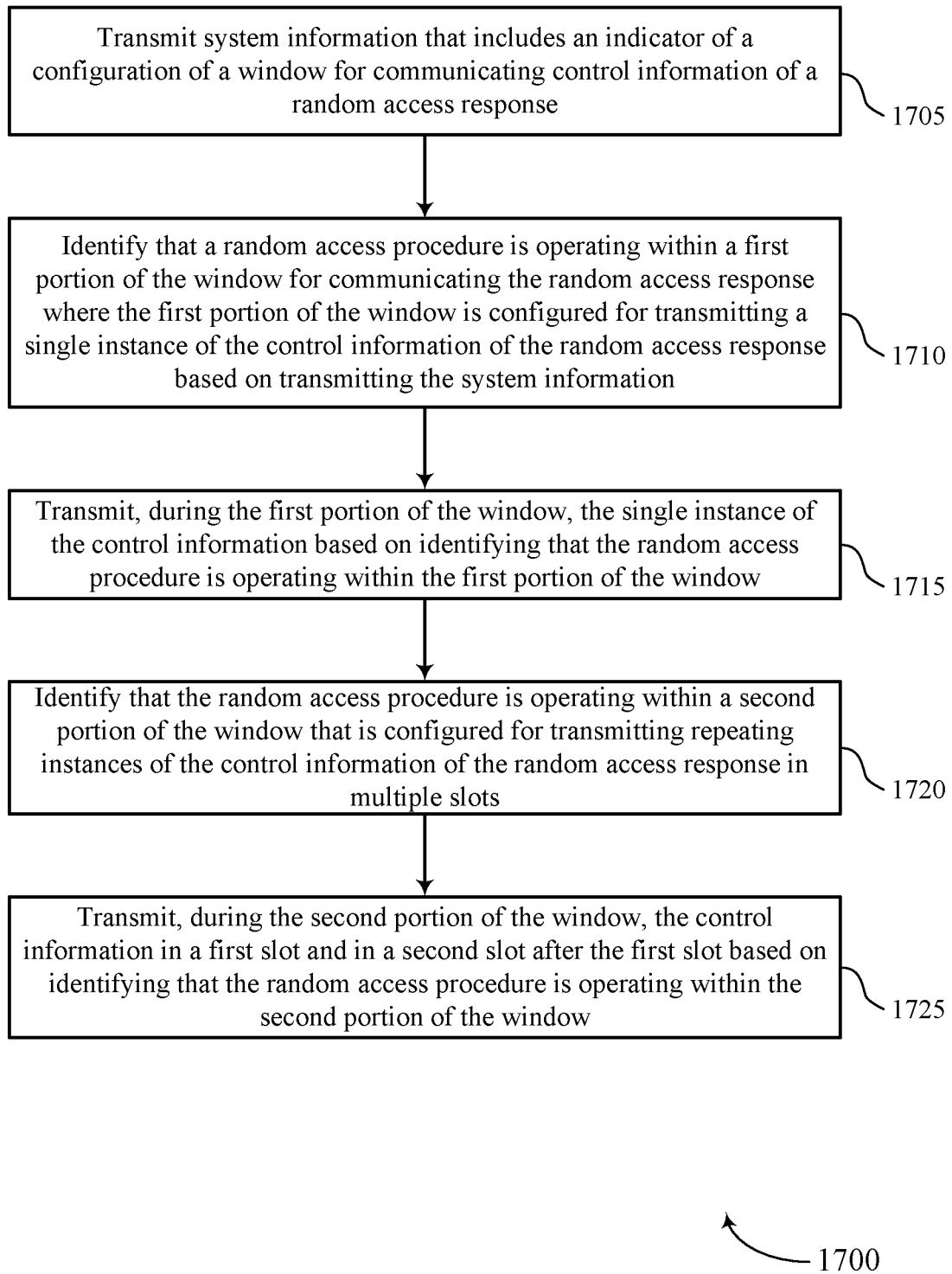

FIG. 17 shows a flowchart illustrating a method 1700 that supports message repetition for a random access procedure in accordance with aspects of the present disclosure. The operations of method 1700 may be implemented by a base station 105 or its components as described herein. For example, the operations of method 1700 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1705, the base station may transmit system information that includes an indicator of a configuration of a window for communicating control information of a RAR. The operations of 1705 may be performed according to the methods described herein. In some examples, aspects of the operations of 1705 may be performed by a system information manager as described with reference to FIGS. 10 through 13.

At 1710, the base station may identify that a random access procedure is operating within a first portion of the window for communicating the RAR where the first portion of the window is configured for transmitting a single instance of the control information of the RAR based on transmitting the system information. The operations of 1710 may be performed according to the methods described herein. In some examples, aspects of the operations of 1710 may be performed by a repetition manager as described with reference to FIGS. 10 through 13.

At 1715, the base station may transmit, during the first portion of the window, the single instance of the control information based on identifying that the random access procedure is operating within the first portion of the window. The operations of 1715 may be performed according to the methods described herein. In some examples, aspects of the operations of 1715 may be performed by a message manager as described with reference to FIGS. 10 through 13.

At 1720, the base station may identify that the random access procedure is operating within a second portion of the window that is configured for transmitting repeating instances of the control information of the RAR in multiple slots. The operations of 1720 may be performed according to the methods described herein. In some examples, aspects of the operations of 1720 may be performed by a repetition manager as described with reference to FIGS. 10 through 13.

At 1725, the base station may transmit, during the second portion of the window, the control information in a first slot and in a second slot after the first slot based on identifying that the random access procedure is operating within the second portion of the window. The operations of 1725 may be performed according to the methods described herein. In some examples, aspects of the operations of 1725 may be performed by a message manager as described with reference to FIGS. 10 through 13.

The following provides an overview of aspects of the present disclosure:

Aspect 1: A method for wireless communication at a UE, comprising: identifying that a random access procedure is operating within a portion of a window for communicating a RAR where the portion of the window is configured for repeatedly providing control information associated with the RAR in multiple slots; monitoring, during the portion of the window, a plurality of slots for instances of the control information based at least in part on identifying that the random access procedure is operating within the portion of the window configured for repeatedly providing the control information in multiple slots; combining the instances identified from monitoring the plurality of slots; and decoding the RAR received as part of the random access procedure based at least in part on combining the instances.

Aspect 2: The method of aspect 1, further comprising: identifying that the portion of the window configured for repeatedly providing the control information in multiple slots occurs after a length of the window indicated by system information has expired, wherein monitoring the plurality of slots is based at least in part on the identifying.

Aspect 3: The method of any of aspects 1 through 2, further comprising: identifying that the portion of the window configured for repeatedly providing the control information in multiple slots occurs during at least a second portion of a length of the window indicated by system information, wherein monitoring the plurality of slots is based at least in part on the identifying.

Aspect 4: The method of any of aspects 1 through 3, further comprising: receiving system information that includes an indicator of a configuration of the window, wherein identifying that that the random access procedure is operating within the portion of the window is based at least in part on receiving the system information that includes the indicator.

Aspect 5: The method of aspect 4, further comprising: identifying an index value of the configuration included in the system information; and retrieving information about the configuration of the window based at least in part on identifying the index value, wherein identifying that the random access procedure is operating within the portion of the window is based at least in part on retrieving the information.

Aspect 6: The method of any of aspects 4 through 5, further comprising: identifying information about a repetition level associated with each portion of the window for communicating RARs included in the system information, wherein identifying that the random access procedure is operating within the portion of the window is based at least in part on identifying the information.

Aspect 7: The method of any of aspects 4 through 6, further comprising: identifying the configuration of the window for communicating the RAR as part of the random access procedure based at least in part on receiving the system information that includes the indicator, wherein identifying that that the random access procedure is operating within the portion of the window is based at least in part on identifying the configuration.

Aspect 8: The method of any of aspects 4 through 7, wherein the system information includes a second indicator for indicating a length of the window different than the indicator.

Aspect 9: The method of any of aspects 4 through 7, wherein the indicator of the configuration of the window is included in a second indicator for indicating a length of the window.

Aspect 10: The method of any of aspects 4 through 9, wherein the indicator of the system information for indicating the configuration of the window comprises one or more bits.

Aspect 11: The method of any of aspects 4 through 10, wherein the system information comprises a SIB or a MIB.

Aspect 12: The method of any of aspects 1 through 11, further comprising: identifying a location of the RAR in a data channel based at least in part on combining the instances of the control information, wherein decoding the RAR is based at least in part on identifying the location of the RAR in the data channel.

Aspect 13: The method of any of aspects 1 through 12, wherein the control information is conveyed by a PDCCH and describes information about the RAR that is conveyed by a PDSCH.

Aspect 14: The method of any of aspects 1 through 13, further comprising: identifying that the random access procedure is operating within a second portion of the window that is configured for transmitting a single instance of the control information of the RAR; and monitoring, during the second portion of the window, a second plurality of slots for the single instance of the control information based at least in part on identifying that the random access procedure is operating within the second portion of the window, wherein identifying that the random access procedure is operating within the portion of the window is based at least in part on monitoring the second plurality of slots for the single instance of the control information.

Aspect 15: The method of any of aspects 1 through 14, further comprising: performing a parity check on the control information generated from combining the instances, wherein decoding the RAR is based at least in part on performing the parity check.

Aspect 16: The method of any of aspects 1 through 15, further comprising: initiating the random access procedure; and transmitting, to a base station, a random access request, wherein monitoring the plurality of slots is based at least in part on transmitting the random access request.

Aspect 17: The method of any of aspects 1 through 16, further comprising: transmitting, to a base station, a radio resource control connection request based at least in part on decoding the RAR.

Aspect 18: The method of any of aspects 1 through 17, wherein the instances combined after monitoring the plurality of slots comprise similar or identical copies of the control information.

Aspect 19: The method of any of aspects 1 through 18, wherein the window further comprises: a first portion for transmitting a single instance of the control information; and a second portion for transmitting repeating instances of the control information in multiple slots according to a first repetition level.

Aspect 20: The method of aspect 19, wherein the window further comprises a third portion for transmitting repeating instances of the control information in multiple slots according to a second repetition level different than the first repetition level.

Aspect 21: The method of any of aspects 1 through 20, wherein a repetition level associated with the portion of the window comprises a numerical quantity of multiple slots for repeating the control information.

Aspect 22: The method of any of aspects 1 through 21, wherein the RAR comprises a message2 of the random access procedure.

Aspect 23: The method of any of aspects 1 through 22, further comprising: identifying a repetition level associated with the instances for combining or an index associated with the instances for combining, wherein combining the instances is based at least in part on identifying the repetition level or the index of the instances for combining.

Aspect 24: The method of aspect 23, wherein the instances that are combined have a same repetition level or have a same index.

Aspect 25: The method of any of aspects 1 through 24, wherein the multiple slots are consecutive slots.

Aspect 26: A method for wireless communication at a base station, comprising: identifying that a random access procedure is operating within a first portion of a window for communicating a RAR where the first portion of the window is configured for transmitting a single instance of control information of the RAR; transmitting, during the first portion of the window, the single instance of the control information based at least in part on identifying that the random access procedure is operating within the first portion of the window; identifying that the random access procedure is operating within a second portion of the window that is configured for transmitting repeating instances of the control information of the RAR in multiple slots; and transmitting, during the second portion of the window, the control information in a first slot and in a second slot after the first slot based at least in part on identifying that the random access procedure is operating within the second portion of the window.

Aspect 27: The method of aspect 26, further comprising: identifying that the second portion of the window configured for repeatedly providing the control information in multiple slots occurs after a length of the window indicated by system information has expired based at least in part on a configuration of the window, wherein transmitting the control information in the first slot and the second slot is based at least in part on the identifying.

Aspect 28: The method of any of aspects 26 through 27, further comprising: identifying that the second portion of the window configured for repeatedly providing the control information in multiple slots occurs during at least a third portion of a length of the window indicated by system information based at least in part on a configuration of the window, wherein transmitting the control information in the first slot and the second slot is based at least in part on the identifying.

Aspect 29: The method of any of aspects 26 through 28, further comprising: identifying a configuration of the window for communicating the RAR as part of the random access procedure, the configuration of the window including at least one portion for repeatedly providing the control information of the RAR in multiple slots, wherein identifying that the random access procedure is operating within the first portion of the window is based at least in part on identifying the configuration.

Aspect 30: The method of any of aspects 26 through 29, further comprising: transmitting system information that includes an indicator of a configuration of the window for communicating the control information of the RAR, wherein identifying that the random access procedure is operating within the first portion of the window is based at least in part on transmitting the system information.

Aspect 31: The method of aspect 30, further comprising: identifying an index value of the configuration, wherein the indicator of the configuration of the window included in the system information comprises the index value.

Aspect 32: The method of any of aspects 30 through 31, wherein the system information includes a second indicator for indicating a length of the window different than the indicator.

Aspect 33: The method of any of aspects 30 through 31, wherein the indicator of the configuration of the window is included in a second indicator for indicating a length of the window.

Aspect 34: The method of any of aspects 30 through 33, wherein the indicator of the system information for indicating the configuration of the window comprises one or more bits.

Aspect 35: The method of any of aspects 30 through 34, wherein the system information comprises a SIB or a MIB.

Aspect 36: The method of any of aspects 26 through 35, further comprising: identifying that a timer associated with the first portion of the window has expired and that a message has not been received from a UE before the timer has expired, wherein identifying that the random access procedure is operating within the second portion is based at least in part on the identifying.

Aspect 37: The method of aspect 36, wherein the message comprises a message3 of the random access procedure.

Aspect 38: The method of any of aspects 26 through 37, further comprising: identifying information about a repetition level for repeating transmissions of the control information associated with each portion of the window, wherein an indicator of a configuration of the window included in the system information comprises the information.

Aspect 39: The method of any of aspects 26 through 38, further comprising: receiving a radio resource control connection request based at least in part on transmitting the control information in the first slot and in the second slot after the first slot during the second portion of the window; and advancing the random access procedure based at least in part on receiving the radio resource control connection request.

Aspect 40: The method of any of aspects 26 through 39, further comprising: identifying that the base station is operating in a connectivity condition that satisfies a signal quality threshold, wherein identifying that the random access procedure is operating within the first portion of the window is based at least in part on identifying that the base station is operating in the connectivity condition that satisfies the signal quality threshold.

Aspect 41: The method of any of aspects 26 through 40, further comprising: receiving, from a UE, a random access request, wherein transmitting the control information is based at least in part on receiving the random access request.

Aspect 42: The method of any of aspects 26 through 41, wherein the first portion of the window is for transmitting the single instance of the control information; and the second portion of the window is for transmitting repeating instances of the control information in multiple slots according to a first repetition level.

Aspect 43: The method of aspect 42, wherein the window further comprises a third portion for transmitting repeating instances of the control information in multiple slots according to a second repetition level different than the first repetition level.

Aspect 44: The method of any of aspects 26 through 43, wherein a repetition level associated with the second portion of the window comprises a numerical quantity of multiple slots for repeating the control information.

Aspect 45: The method of any of aspects 26 through 44, wherein the RAR comprises a message2 of the random access procedure.

Aspect 46: The method of any of aspects 26 through 45, wherein the multiple slots are consecutive slots and the second slot is a consecutive slot after the first slot.

Aspect 47: The method of any of aspects 26 through 46, wherein the instances of the control information transmitted in the first slot and the second slot comprise identical copies of the control information.

Aspect 48: An apparatus for wireless communication at a UE, comprising a processor; memory coupled with the processor; and instructions stored in the memory and executable by the processor to cause the apparatus to perform a method of any of aspects 1 through 25.

Aspect 49: An apparatus for wireless communication at a UE, comprising at least one means for performing a method of any of aspects 1 through 25.

Aspect 50: A non-transitory computer-readable medium storing code for wireless communication at a UE, the code comprising instructions executable by a processor to perform a method of any of aspects 1 through 25.

Aspect 51: An apparatus for wireless communication at a base station, comprising a processor; memory coupled with the processor; and instructions stored in the memory and executable by the processor to cause the apparatus to perform a method of any of aspects 26 through 47.

Aspect 52: An apparatus for wireless communication at a base station, comprising at least one means for performing a method of any of aspects 26 through 47.

Aspect 53: A non-transitory computer-readable medium storing code for wireless communication at a base station, the code comprising instructions executable by a processor to perform a method of any of aspects 26 through 47.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
monitoring, during a first portion of a window for communicating a random access response associated with a random access procedure, for a single instance of control information associated with the random access response;
monitoring, during a second portion of the window, a plurality of slots for repeating instances of the control information based at least in part on the second portion of the window being configured for repeatedly providing the control information in multiple slots;
combining the repeating instances identified from monitoring the plurality of slots during the second portion of the window; and
decoding the random access response received as part of the random access procedure based at least in part on combining the repeating instances.

2. The method of claim 1, further comprising:
identifying that the second portion of the window configured for repeatedly providing the control information in multiple slots occurs after a length of the window indicated by system information has expired, wherein monitoring the plurality of slots is based at least in part on the identifying that the second portion of the window configured for repeatedly providing the control information in multiple slots occurs after the length of the window indicated by the system information has expired.

3. The method of claim 1, further comprising:
identifying that the second portion of the window configured for repeatedly providing the control information in multiple slots occurs during at least a second portion of a length of the window indicated by system information, wherein monitoring the plurality of slots is based at least in part on the identifying that the second portion of the window configured for repeatedly providing the control information in multiple slots occurs during at least the second portion of the length of the window indicated by the system information.

4. The method of claim 1, further comprising:
receiving system information that includes an indicator of a configuration of the window, wherein monitoring for the single instance of the control information during the first portion of the window and monitoring for the repeating instances of the control information during the second portion of the window is based at least in part on receiving the system information that includes the indicator.

5. The method of claim 4, further comprising:
identifying an index value of the configuration included in the system information; and
retrieving information about the configuration of the window based at least in part on identifying the index value.

6. The method of claim 4, further comprising:
identifying information about a repetition level associated with each portion of the window for communicating random access responses included in the system information.

7. The method of claim 4, further comprising:
identifying the configuration of the window for communicating the random access response as part of the random access procedure based at least in part on receiving the system information that includes the indicator.

8. The method of claim 4, wherein the system information includes a second indicator for indicating a length of the window different than the indicator.

9. The method of claim 4, wherein the indicator of the configuration of the window is included in a second indicator for indicating a length of the window.

10. The method of claim 1, further comprising:
identifying a location of the random access response in a data channel based at least in part on combining the repeating instances of the control information, wherein decoding the random access response is based at least in part on identifying the location of the random access response in the data channel.

11. The method of claim 1, wherein the control information is conveyed by a physical downlink control channel and describes information about the random access response that is conveyed by a physical downlink shared channel.

12. The method of claim 1, wherein monitoring during the first portion of the window comprises:
identifying that the random access procedure is operating within the first portion of the window that is configured for transmitting the single instance of the control information of the random access response; and
monitoring, during the first portion of the window, a second plurality of slots for the single instance of the control information based at least in part on identifying that the random access procedure is operating within the second portion of the window, wherein identifying that the random access procedure is operating within the first portion of the window is based at least in part on monitoring the second plurality of slots for the single instance of the control information.

13. The method of claim 1, wherein the repeating instances of the control information are associated with a first repetition level.

14. The method of claim 13, wherein the window further comprises a third portion for transmitting second repeating instances of the control information in multiple slots according to a second repetition level different than the first repetition level.

15. A method for wireless communication at a network device, comprising:
identifying that a random access procedure is operating within a first portion of a window for communicating a random access response where the first portion of the window is configured for transmitting a single instance of control information of the random access response;
transmitting, during the first portion of the window, the single instance of the control information based at least in part on identifying that the random access procedure is operating within the first portion of the window;
identifying that the random access procedure is operating within a second portion of the window that is configured for transmitting repeating instances of the control information of the random access response in multiple slots; and
transmitting, during the second portion of the window, the control information in a first slot and in a second slot after the first slot based at least in part on identifying that the random access procedure is operating within the second portion of the window.

16. The method of claim 15, further comprising:
identifying that the second portion of the window configured for repeatedly providing the control information in multiple slots occurs after a length of the window indicated by system information has expired based at least in part on a configuration of the window, wherein transmitting the control information in the first slot and the second slot is based at least in part on the identifying that the second portion of the window configured for repeatedly providing the control information in multiple slots occurs after the length of the window indicated by the system information has expired.

17. The method of claim 15, further comprising:
identifying that the second portion of the window configured for repeatedly providing the control information in multiple slots occurs during at least a third portion of a length of the window indicated by system information based at least in part on a configuration of the window, wherein transmitting the control information in the first slot and the second slot is based at least in part on the identifying that the second portion of the window configured for repeatedly providing the control information in multiple slots occurs during at least the third portion of the length of the window indicated by the system information.

18. The method of claim 15, further comprising:
identifying a configuration of the window for communicating the random access response as part of the random access procedure, the configuration of the window including at least one portion for repeatedly providing the control information of the random access response in multiple slots, wherein identifying that the random access procedure is operating within the first portion of the window is based at least in part on identifying the configuration.

19. The method of claim 15, further comprising:
transmitting system information that includes an indicator of a configuration of the window for communicating the control information of the random access response, wherein identifying that the random access procedure is operating within the first portion of the window is based at least in part on transmitting the system information.

20. The method of claim 19, further comprising:
identifying an index value of the configuration, wherein the indicator of the configuration of the window included in the system information comprises the index value.

21. The method of claim 19, wherein the system information includes a second indicator for indicating a length of the window different than the indicator.

22. The method of claim 19, wherein the indicator of the configuration of the window is included in a second indicator for indicating a length of the window.

23. The method of claim 15, further comprising:
identifying that a timer associated with the first portion of the window has expired and that a message has not been received from a user equipment before the timer has expired, wherein identifying that the random access procedure is operating within the second portion is based at least in part on the identifying that the timer associated with the first portion of the window has expired and that the message has not been received from the user equipment before the timer has expired.

24. The method of claim 15, further comprising:
identifying information about a repetition level for repeating transmissions of the control information associated with each portion of the window, wherein an indicator of a configuration of the window included in system information comprises the information.

25. The method of claim 15, further comprising:
receiving a radio resource control connection request based at least in part on transmitting the control information in the first slot and in the second slot after the first slot during the second portion of the window; and advancing the random access procedure based at least in part on receiving the radio resource control connection request.

26. The method of claim 15, further comprising:
identifying that the network device is operating in a connectivity condition that satisfies a signal quality threshold, wherein identifying that the random access procedure is operating within the first portion of the window is based at least in part on identifying that the network device is operating in the connectivity condition that satisfies the signal quality threshold.

27. The method of claim 15, wherein:
the first portion of the window is for transmitting the single instance of the control information; and
the second portion of the window is for transmitting repeating instances of the control information in multiple slots according to a first repetition level.

28. The method of claim 27, wherein the window further comprises a third portion for transmitting repeating instances of the control information in multiple slots according to a second repetition level different than the first repetition level.

29. An apparatus for wireless communication at a user equipment, comprising:
a processor,
memory coupled with the processor, and
instructions stored in the memory and operable, when executed by the processor, to cause the apparatus to:
monitor, during a first portion of a window for communicating a random access response associated with a random access procedure, for a single instance of control information associated with the random access response;
monitor, during a second portion of the window, a plurality of slots for repeating instances of the control information based at least in part on the second portion of the window being configured for repeatedly providing the control information in multiple slots;
combine the repeating instances identified from monitoring the plurality of slots during the second portion of the window; and
decode the random access response received as part of the random access procedure based at least in part on combining the repeating instances.

30. An apparatus for wireless communication at a network device, comprising:
a processor,
memory coupled with the processor, and
instructions stored in the memory and operable, when executed by the processor, to cause the apparatus to:
identify that a random access procedure is operating within a first portion of a window for communicating a random access response where the first portion of the window is configured for transmitting a single instance of control information of the random access response;
transmit, during the first portion of the window, the single instance of the control information based at least in part on identifying that the random access procedure is operating within the first portion of the window;
identify that the random access procedure is operating within a second portion of the window that is configured for transmitting repeating instances of the control information of the random access response in multiple slots; and
transmit, during the second portion of the window, the control information in a first slot and in a second slot after the first slot based at least in part on identifying that the random access procedure is operating within the second portion of the window.

* * * * *